US009483830B2

(12) United States Patent
Barone

(10) Patent No.: US 9,483,830 B2
(45) Date of Patent: Nov. 1, 2016

(54) DEPTH MAP GENERATION METHOD, RELATED SYSTEM AND COMPUTER PROGRAM PRODUCT

(71) Applicant: STMicroelectronics S.r.l., Agrate Brianza (IT)

(72) Inventor: Massimiliano Barone, Cormano (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 78 days.

(21) Appl. No.: 14/336,777

(22) Filed: Jul. 21, 2014

(65) Prior Publication Data

US 2015/0023588 A1    Jan. 22, 2015

(30) Foreign Application Priority Data

Jul. 22, 2013  (IT) .............................. TO2013A0617
Jul. 22, 2013  (IT) .............................. TO2013A0618
Jul. 22, 2013  (IT) .............................. TO2013A0619

(51) Int. Cl.
*G06T 7/00* (2006.01)
(52) U.S. Cl.
CPC ........... *G06T 7/0075* (2013.01); *G06T 7/0067* (2013.01); *G06T 2207/10028* (2013.01)
(58) Field of Classification Search
None
See application file for complete search history.

(56) References Cited

U.S. PATENT DOCUMENTS

| 5,845,006 A | 12/1998 | Sumi et al. |
| 2007/0024614 A1 | 2/2007 | Tam et al. |
| 2010/0182410 A1* | 7/2010 | Verburgh ............... G06T 7/0071 348/51 |
| 2011/0188736 A1 | 8/2011 | Xu |
| 2012/0014590 A1 | 1/2012 | Martinez-Bauza et al. |
| 2012/0051624 A1* | 3/2012 | Ando ................. H04N 13/0239 382/154 |
| 2013/0170736 A1 | 7/2013 | Guo et al. |
| 2013/0329015 A1 | 12/2013 | Pulli et al. |
| 2014/0240467 A1* | 8/2014 | Petyushko ......... H04N 13/0022 348/47 |
| 2014/0333739 A1 | 11/2014 | Yang et al. |
| 2015/0332123 A1* | 11/2015 | Reibman .............. G06K 9/6215 382/190 |

FOREIGN PATENT DOCUMENTS

EP     2 511 875 A1    10/2012

OTHER PUBLICATIONS

Barnard et al., "Computational Stereo," *Computing Surveys* 14(4):553-572, Dec. 1982.
Barnard et al., "Disparity Analysis of Images," *IEEE Transactions on Pattern Analysis and Machine Intelligence* PAMI—2(4):333-340, Jul. 1980.

(Continued)

*Primary Examiner* — Stephen R Koziol
*Assistant Examiner* — Delomia L Gilliard
(74) *Attorney, Agent, or Firm* — Seed IP Law Group PLLC

(57) ABSTRACT

A depth map is generated from at least a first and a second image. A plurality of reference pixels are selected in the first image. A cost function is used to associate each reference pixel with a respective pixel in the second image. A masking operation is used to identify a subset of pixels in a block of pixels surrounding a reference pixel and the cost function is based on the identified subset of pixels. A disparity between each reference pixel and the respective pixel in said second image is determined, and a depth value is determined for each reference pixel as a function of the respective disparity. A depth map is generated based on the determined depth values.

20 Claims, 14 Drawing Sheets

(56) References Cited

OTHER PUBLICATIONS

Damjanović et al., "Sparse Window Local Stereo Matching," Proceedings of the International Conference on Computer Vision Theory and Applications, Vilamoura, Algarve, Portugal, Mar. 5-7, 2011, pp. 689-693.
Gupta et al., "Real-time Stereo Matching using Adaptive Binary Window," Retrieved from https://diglib.eg.org/EG/DL/PE/3DPVT/3 on Mar. 3, 2014, 8 pages.
Hariyama et al., "Reliable Stereo Matching for Highly-Safe Intelligent Vehicles and Its VLSI Implementation," Proceedings of the IEEE Intelligent Vehicles Symposium 2000, Dearborn (MI), USA, Oct. 3-5, 2000, pp. 128-133.
Levine et al., "Computer Determination of Depth Maps," *Computer Graphics and Image Processing* 2:131-150, 1973.
Ramponi et al., "An adaptive irregular sampling algorithm and its application to image coding," *Image and Vision Computing* 19(7), May 2001, 20 pages.
Sarkis et al., "Sparse Stereo Matching Using Belief Propagation," 15$^{th}$ IEEE International Conference, IEEE, Piscataway, NJ, USA, Oct. 12, 2008, pp. 1780-1783.
Scharstein et al., "High-Accuracy Stereo Depth Maps Using Structured Light," Proceedings of the 2003 IEEE Computer Society Conference on Computer Vision and Pattern Recognition (CVPR'03), 2003, 8 pages.
Scharstein et al., "A Taxonomy and Evaluation of Dense Two-Frame Stereo Correspondence Algorithms," *International Journal of Computer Vision* 47(1/2/3):7-42, 2002.
Di Stefano et al., "A fast area-based stereo matching algorithm," *Image and Vision Computing* 22:983-1005, 2004.
Tomasi et al., "Stereo Matching as a Nearest-Neighbor Problem," *IEEE Transactions on Pattern Analysis and Machine Intelligence* 20(3):333-340, Mar. 1998.
Tombari et al., "Classification and evaluation of cost aggregation methods for stereo correspondence," IEEE Conference on Computer Vision and Pattern Recognition, Piscataway, NJ, USA, Jun. 23, 2008, 8 pages.
Zhang et al., "Scalable Stereo Matching with Locally Adaptive Polygon Approximation," IEEE International Conference on Image Processing, Piscataway, NJ, USA, Oct. 12, 2008, pp. 313-316.
Hayashi et al., "Occlusion Detection of Real Objects using Contour Based Stereo Matching," ICAT 2005, Dec. 5, 2005, 7 pages.

\* cited by examiner

DEPTH MAP GENERATION METHOD, RELATED SYSTEM AND COMPUTER PROGRAM PRODUCT

BACKGROUND

1. Technical Field

Embodiments of the present description relate to the estimation of depth maps.

2. Description of the Related Art

In computer vision, a typical problem relates to the estimation of a depth map from at least two images of the same object obtained from different views. Usually, during the depth map estimation process, a depth value is associated with each pixel of the depth map. For example, the values of the depth map may be represented as a grayscale image.

For example, FIGS. 1a and 1b illustrate respectively an example of a left and right image and FIG. 1c shows a possible depth map in grayscale.

Substantially, FIGS. 1a and 1b correspond to the well-known "cone" reference images of the "2003 Stereo datasets with ground truth", which have been created by Daniel Scharstein, Alexander Vandenberg-Rodes, and Richard Szelisk. The original versions of the images are published, e.g., in Daniel Scharstein and Richard Szeliski, "*High-accuracy stereo depth maps using structured light*", IEEE Computer Society Conference on Computer Vision and Pattern Recognition (CVPR 2003), volume 1, pages 195-202, Madison, Wis., June 2003.

Various methods exist to obtain a depth map. For this reason, a research group of the Middlebury College has defined a taxonomy method which permits to classify different solutions for generating depth map images, see e.g., Daniel Scharstein and Richard Szeliski, "*A Taxonomy and Evaluation of Dense Two-Frame Stereo Correspondence Algorithms*", International Journal of Computer Vision, 2002, Vol. 47, pages 7-42. The above mentioned article from Scharstein et al. provides also a general overview of methods, which may be classified as local methods, global methods, dynamic programming and cooperative algorithms.

FIG. 2 illustrates a block diagram, which shows the major steps of typical methods of estimating depth maps.

Substantially, most methods include a set-up phase 100, a matching phase 102, a filtering phase 104 and a refinement phase 106. For example, the set-up phase 100 may include a conversion of the original images from color images to grayscale images, such as a RGB to grayscale conversion 1002, a rescaling of the images 1004, a noise filtering 1006, a rectification 1008, a feature extraction 1010 and/or color segmentation 1012. The matching phase 102 may include a matching cost computation step 1022 and a cost (support) aggregation step 1024. The filtering phase 104 may include a disparity computation step 1042 and a disparity optimization step 1044. Finally, the refinement phase 106 may include a disparity refinement step 1062.

One of the known methods for generating depth images is called "block matching". Specifically, in block matching, a square of pixels is used for each pixel (reference pixel) in the reference image, such as the left image, and compared with possible squares in the second image, e.g., the right image, to find the best association between both center pixels. Usually, not all squares in the second image are used, but the search may be limited only to a subset of squares, such as the squares with the same vertical coordinates, e.g., the same row, as the reference pixel. In this case, the differences between the horizontal coordinates, e.g., columns, provides the disparity and the depth may be calculated, e.g., as the inverse of the disparity.

BRIEF SUMMARY

The inventor has observed that the block matching method often does not handle well occlusions and thin objects, because in this case the left and the right image comprise only some minor local differences.

Moreover, depth map estimation requires a lot of data processing and is thus usually slow.

In an embodiment, a method of producing a depth map is disclosed. This disclosure also relates to corresponding systems, as well as a corresponding related computer program product, loadable in the memory of at least one computer and including software code portions for performing the steps of one or more of the methods disclosed herein. Reference to "at least one computer" is evidently intended to highlight the possibility for embodiments to be implemented in a distributed/modular fashion.

As mentioned in the foregoing, the disclosure describes techniques for estimating depth maps from at least a first and a second image.

Generally, in various embodiments, a plurality of reference pixels are selected in the first image and with each reference pixel is associated a respective pixel in the second image. Next, the disparity between each reference pixel and the respective pixel in the second image is determined, and a depth value is calculated as a function of the respective disparity.

For example, in various embodiments, a reference pixel is associated with the respective pixel through a masking and matching operation, which compares the reference pixel with a plurality of candidate pixel in the second image.

In some embodiments, in order to select the pixels to be used by the matching operation, a block of pixels surrounding the reference pixel is selected and compared with a respective block of pixels surrounding a respective candidate pixel. Next, at least one masking operation is applied to the block of pixels surrounding the reference pixel and/or to the block of pixels surrounding the respective candidate pixel in order to select a sub-set of pixels. For example, in some embodiments, the pixels in the block may be selected which have similar values. Moreover, only the pixels may be maintained which have a similar value as the reference pixel and/or the candidate pixel.

Thus, in some embodiments, the matching operation calculates a cost function, which takes into account the pixels selected via the masking operation.

In an embodiment, a method of generating a depth map from at least a first and a second image, comprises: selecting a plurality of reference pixels in said first image, associating with each reference pixel a respective pixel in the second image, determining the disparity between each reference pixel and the respective pixel in said second image, and determining for each reference pixel a depth value as a function of the respective disparity, wherein said associating with each reference pixel a respective pixel in the second image includes, for each reference pixel: selecting for the reference pixel a block of pixels surrounding the reference pixel, selecting for said reference pixel a plurality of candidate pixel in said second image, performing the following operations for each candidate pixel in said second image: selecting for the candidate pixel in said second image a block of pixels surrounding the candidate pixel, said block of pixels surrounding the candidate pixel having the same dimension as said block of pixels surrounding the reference pixel, applying at least one masking operation to said block of pixels surrounding the reference pixel and/or to said block of pixels surrounding the candidate pixel in order to select a sub-set of pixels, performing a matching operation in order to select one or more candidate pixels in said second image that best match the reference pixel, wherein said matching operation calculates, for each candidate pixel in said second image, a respective cost function as a function of the pixels of said block of pixels surrounding the reference pixel and the respective block of pixels surrounding the respective candidate pixel, and wherein said cost function takes into account only the pixels in the respective sub-set of pixels. In an embodiment, said selecting for the reference pixel a block of pixels surrounding the reference pixel comprises selecting a block of pixel centered on said reference pixel, and selecting for the candidate pixel in said second image a block of pixels surrounding the candidate pixel comprises selecting a block of pixel centered on the candidate pixel. In an embodiment, said selecting for said reference pixel a plurality of candidate pixel in said second image comprises selecting the pixels in said second image which belong to the same row as said reference pixel. In an embodiment, said applying at least one masking operation to said block of pixels surrounding the reference pixel and/or to said block of pixels surrounding the candidate pixel in order to select a sub-set of pixels comprises: selecting in said block of pixels surrounding the reference pixel the pixels having similar values as the corresponding pixels in said block of pixels surrounding the candidate pixel, and/or selecting in said block of pixels surrounding the reference pixel the pixels having similar values as said reference pixel, and/or selecting in said block of pixels surrounding the candidate pixels the pixels having a similar value as said candidate pixel. In an embodiment, said pixels having similar values are selected by: calculating a value being indicative for the difference between the grayscale values and/or color values of the respective pixels, such as an absolute difference or a sum of absolute difference, and comparing said value being indicative for the difference between the grayscale values and/or color values of the respective pixels with a given threshold. In an embodiment, selecting a plurality of reference pixels in said first image comprises: selecting all pixels in said first image, or performing a pre-matching operation in order to select a subset of pixels in said first image, and/or performing a down-sampling operation in order to select a subset of pixels in said first image. In an embodiment, said pre-matching operation comprises performing the following steps for each pixel in said first image: selecting a block of pixels surrounding the respective pixel in said first image, calculating the average value of the pixels in said block of pixels surrounding the respective pixel in said first image and associating said average value with said pixel in said first image, selecting a plurality of candidate pixel in said second image, and selecting for each candidate pixel in said second image a respective block of pixel surrounding the pixel in said second image, calculating the average value of the pixels of each of said blocks of pixels surrounding the respective pixels in said second image and associating said average value with the respective pixel in said second image, and selecting the pixels in said first image for which exists at least one candidate pixel in said second image which has associated a similar average value. In an embodiment, said pre-matching operation comprises performing the following steps for each pixel in said first and/or said second image: selecting a block of pixels surrounding the respective pixel in said first image and/or second image, calculating the average gradient value, with respect to the value of the respective pixel in said first and/or said second image, of the pixels in said block of pixels surrounding the respective pixel in said first and/or second image, and selecting the pixels in said first and/or second image which have an average gradient above a given threshold. In an embodiment, a plurality of candidate pixels in that second image are selected for each reference pixel during said matching operation, and the method comprises performing a filtering operation in order to select for each reference pixel a respective candidate pixel among said plurality of candidate pixels in said second image. In an embodiment, a system generates a depth map from at least a first and a second image by employing one or more of the methods disclosed herein. In an embodiment, a computer-program product that can be loaded into the memory of at least one processor comprises portions of software code to implement one or more of the methods disclosed herein.

In an embodiment, a method comprises: selecting a plurality of reference pixels in a first image; associating with each reference pixel a respective pixel in a second image, the associating including: selecting a block of pixels surrounding the reference pixel; selecting a plurality of candidate pixels in the second image; for each candidate pixel in the second image, selecting a block of pixels surrounding the candidate pixel, said block of pixels surrounding the candidate pixel having a same dimension as said block of pixels surrounding the reference pixel; identifying a subset of pixels in at least one of the block of pixels surrounding the reference pixel and the block of pixels surrounding the candidate pixel, the identifying the subset of pixels including identifying pixels in the block of pixels surrounding the reference pixel which have similar values as corresponding pixels in the block of pixels surrounding the candidate pixel; and determining a cost associated with the candidate pixel based on the identified subset of pixels; and selecting a subset of the candidate pixels based on the determined costs; determining a disparity between each reference pixel and the respective pixel in said second image; determining for each reference pixel a depth value as a function of the respective disparity; and generating a depth map based on the determined depth values. In an embodiment, the associating includes filtering pixels of the selected subset of candidate pixels and associating one of the pixels of the selected subset with the respective reference pixel based on the filtering. In an embodiment, said selecting a block of pixels surrounding the reference pixel comprises selecting a block of pixels centered on said reference pixel; and said selecting a block of pixels surrounding the candidate pixel comprises selecting a block of pixels centered on the candidate pixel. In an embodiment, said selecting a plurality of candidate pixels comprises selecting pixels in said second image which belong to a same row as said reference pixel. In an embodiment, the identifying the subset of pixels includes at least one of: selecting, in said block of pixels surrounding the reference pixel, pixels having similar values as said reference pixel; and selecting, in said block of pixels surrounding the candidate pixel, pixels having a similar value as said candidate pixel. In an embodiment, identifying pixels having similar values comprises at least one of: comparing a value indicative a difference between grayscale values of the pixels with a threshold grayscale difference; and comparing a value indicative of a difference between color values of the pixels with a threshold color difference. In an embodiment, said selecting a plurality of reference pixels in said first image comprises at least one of: selecting all pixels in said first image; selecting a subset of pixels of the first image based on pre-matching; and down-sampling the first image. In an embodiment, said selecting a plurality of reference pixels in the first image comprises: selecting a block of pixels surrounding a pixel in said first image; calculating an average value of pixels in said block of pixels surrounding the pixel in said first image and associating said average value with said pixel in said first image; selecting a plurality of candidate pixel in said second image; selecting for each candidate pixel in said second image a respective block of pixel surrounding the pixel in said second image; calculating an average value of the pixels of each of said blocks of pixels surrounding the respective candidate pixels in said second image and associating said average value with the respective pixel in said second image; and selecting pixels in said first image based on whether at least one candidate pixel in said second image is associated with a similar average value. In an embodiment, selecting a plurality of reference pixels in the first image comprises: selecting a block of pixels surrounding a respective pixel in said first image; calculating an average gradient value, with respect to the value of the respective pixel, of the pixels in said block of pixels surrounding the respective pixel; and selecting the pixels in said first image which have an average gradient above a threshold gradient value. In an embodiment, selecting a plurality of candidate pixels comprises: selecting a block of pixels surrounding a respective pixel in said second image; calculating an average gradient value, with respect to the value of the respective pixel of the second image, of the pixels in said block of pixels surrounding the respective pixel of the second image; and selecting the pixels in said second image which have an average gradient above a threshold gradient value.

In an embodiment, a system comprises: one or more memories; and processing circuitry coupled to the one or more memories, which, in operation, selects a plurality of reference pixels in a first image; associates with each reference pixel a respective pixel in a second image, the associating including: selecting a block of pixels surrounding the reference pixel; selecting a plurality of candidate pixels in the second image; for each candidate pixel in the second image, selecting a block of pixels surrounding the candidate pixel, said block of pixels surrounding the candidate pixel having a same dimension as said block of pixels surrounding the reference pixel; identifying a subset of pixels in at least one of the block of pixels surrounding the reference pixel and the block of pixels surrounding the candidate pixel, the identifying the subset of pixels including identifying pixels in the block of pixels surrounding the reference pixel which have similar values as corresponding pixels in the block of pixels surrounding the candidate pixel; and determining a cost associated with the candidate pixel based on the identified subset of pixels; and selecting a subset of the candidate pixels based on the determined costs; determining a disparity between each reference pixel and the respective pixel in said second image; determining for each reference pixel a depth value as a function of the respective disparity; and generating a depth map based on the determined depth values. In an embodiment, the associating includes filtering pixels of the selected subset of candidate pixels and associating one of the pixels of the selected subset with the respective reference pixel based on the filtering. In an embodiment, said selecting a block of pixels surrounding the reference pixel comprises selecting a block of pixels centered on said reference pixel; and said selecting a block of pixels surrounding the candidate pixel comprises selecting a block of pixels centered on the candidate pixel. In an embodiment, the identifying the subset of pixels includes at least one of: selecting, in said block of pixels surrounding the reference pixel, pixels having similar values as said reference pixel; and selecting, in said block of pixels surrounding the candidate pixel, pixels having a similar value as said candidate pixel. In an embodiment, identifying pixels having similar values comprises at least one of: comparing a value indicative a difference between grayscale values of the pixels with a threshold grayscale difference; and comparing a value indicative of a difference between color values of the pixels with a threshold color difference. In an embodiment, said selecting a plurality of reference pixels in said first image comprises at least one of: selecting all pixels in said first image; selecting a subset of pixels of the first image based on pre-matching; and down-sampling the first image. In an embodiment, said selecting a plurality of reference pixels in the first image comprises: selecting a block of pixels surrounding a pixel in said first image; calculating an average value of pixels in said block of pixels surrounding the pixel in said first image and associating said average value with said pixel in said first image; selecting a plurality of candidate pixel in said second image; selecting for each candidate pixel in said second image a respective block of pixel surrounding the pixel in said second image; calculating an average value of the pixels of each of said blocks of pixels surrounding the respective candidate pixels in said second image and associating said average value with the respective pixel in said second image; and selecting pixels in said first image based on whether at least one candidate pixel in said second image is associated with a similar average value.

In an embodiment, a non-transitory computer-readable memory medium's contents configure an image processing system to generate a depth map by performing a method, the method comprising: selecting a plurality of reference pixels in a first image; associating with each reference pixel a respective pixel in a second image, the associating including: selecting a block of pixels surrounding the reference pixel; selecting a plurality of candidate pixels in the second image; for each candidate pixel in the second image, selecting a block of pixels surrounding the candidate pixel, said block of pixels surrounding the candidate pixel having a same dimension as said block of pixels surrounding the reference pixel; identifying a subset of pixels in at least one of the block of pixels surrounding the reference pixel and the block of pixels surrounding the candidate pixel, the identifying the subset of pixels including identifying pixels in the block of pixels surrounding the reference pixel which have similar values as corresponding pixels in the block of pixels surrounding the candidate pixel; and determining a cost associated with the candidate pixel based on the identified subset of pixels; and selecting a subset of the candidate pixels based on the determined costs; determining a disparity between each reference pixel and the respective pixel in said second image; determining for each reference pixel a depth value as a function of the respective disparity; and generating the depth map based on the determined depth values. In an embodiment, the identifying the subset of pixels includes at least one of: selecting, in said block of pixels surrounding the reference pixel, pixels having similar values as said reference pixel; and selecting, in said block of pixels surrounding the candidate pixel, pixels having a similar value as said candidate pixel. In an embodiment, said selecting a plurality of reference pixels in the first image comprises: selecting a block of pixels surrounding a pixel in said first image; calculating an average value of pixels in said block of pixels surrounding the pixel in said first image and associating said average value with said pixel in said first image; selecting a plurality of candidate pixel in said second image; selecting for each candidate pixel in said second image a respective block of pixel surrounding the pixel in said second image; calculating an average value of the pixels of each of said blocks of pixels surrounding the respective candidate pixels in said second image and associating said average value with the respective pixel in said second image; and selecting pixels in said first image based on whether at least one candidate pixel in said second image is associated with a similar average value.

BRIEF DESCRIPTION OF THE SEVERAL VIEWS OF THE FIGURES

Embodiments will now be described with reference to the annexed drawings, which are provided purely by way of non-limiting example and in which.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 3:
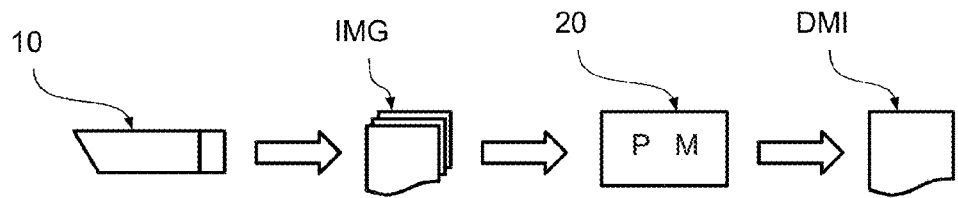
FIG. 3 is a block diagram illustrating the general architecture of a system for depth map estimation.

FIG. 3 is a block diagram which shows an embodiment of a system for generating depth maps.

In the embodiment considered, the system comprises a plurality of cameras 10. Specifically the cameras are arranged to acquire images IMG of the same object from different angles of view. For example a stereo camera comprising two cameras may be used for this purpose.

The images IMG obtained from the two or more cameras 10 are provided to a processing unit 20, such as a microprocessor or a personal computer (including, e.g., one or more processors P and one or more memories M), programmed via software instructions, a dedicated integrated circuit, or a combination of both. For example, the processing could be implemented completely via software or via software accelerated by a GPU or multicore system or finally by a dedicated hardware, which is able to implement the processing operations. Moreover, both hardware and software solutions may introduce different stages of parallelism.

In one embodiment considered, the processing unit 20 processes the images IMG and generates a depth map image DMI. For example, the processing unit 20 may process the images IMG acquired form the cameras 10 and provide a depth map, wherein each pixel of the depth map is identified by a depth value. For example, such a depth map may be considered as being a grayscale image, wherein the darkest value is the furthest while the lightest value is the closest (or vice versa).

Generally, the cameras 10 may have any possible arrangement. However, at least in case two cameras are used, the cameras may be arranged in parallel. For example, as will be described in greater details in the following, the processing unit 20 may rectify the images during a pre-processing phase. For example, for this purpose, the images acquired may be processed by a calibration tool which takes into account a KRT matrix between the cameras, where K depends on optical camera parameters (such as focal, size screen, lens distortion and so on) while RT is rotation and translation transform between the cameras.

Figure 4:
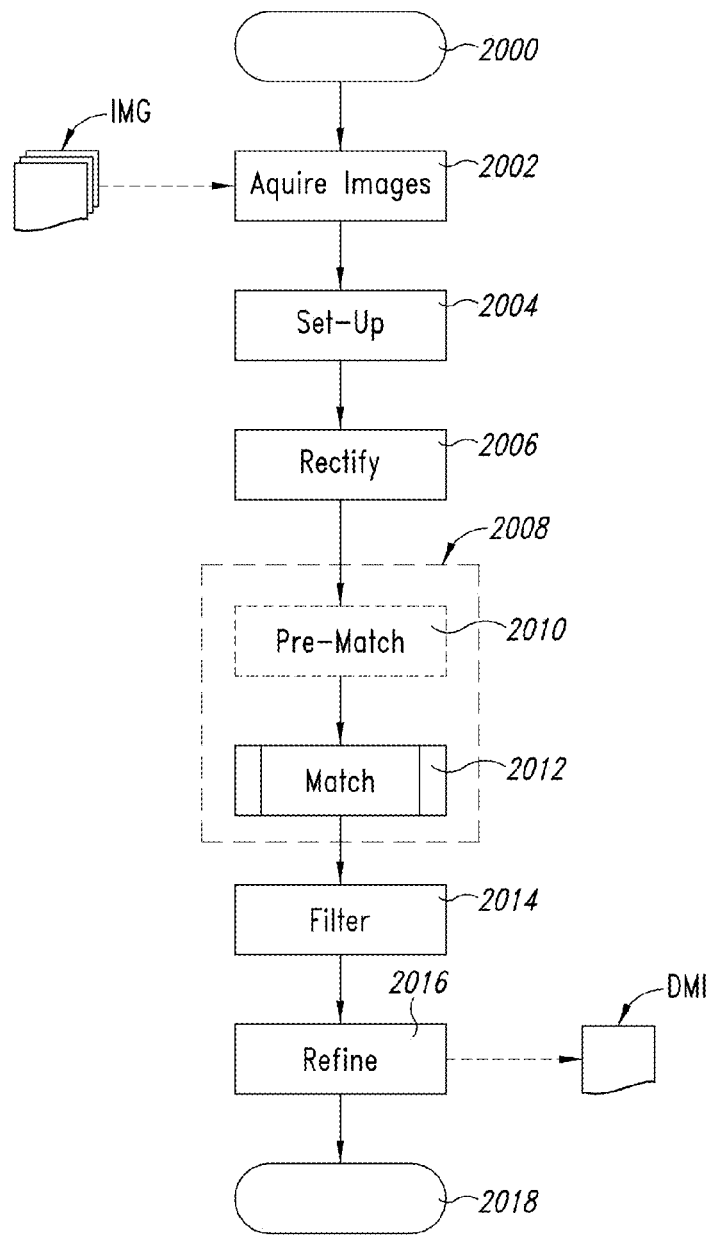
FIG. 4 is a flow-chart showing a first embodiment of a method for estimating depth maps.

FIG. 4 is a flow chart of an embodiment of a method for generating depth maps in accordance with the present disclosure.

After a start step 2000, the method acquires at a step 2002 a plurality of images IMG showing at least one object from different angles of view. For example, the method may read the images IMG from the cameras 10 or may open pre-exiting files.

In the embodiment considered, the method processes these images during a set-up phase 2004.

For example, the set-up phase 2004 may include a color to grayscale conversion, for example the image may be converted from a RGB (red green blue) image to a grayscale image. Moreover, the images may be rescaled, e.g., the dimension may be reduced in order to perform a faster processing with lower quality.

Figure 5:
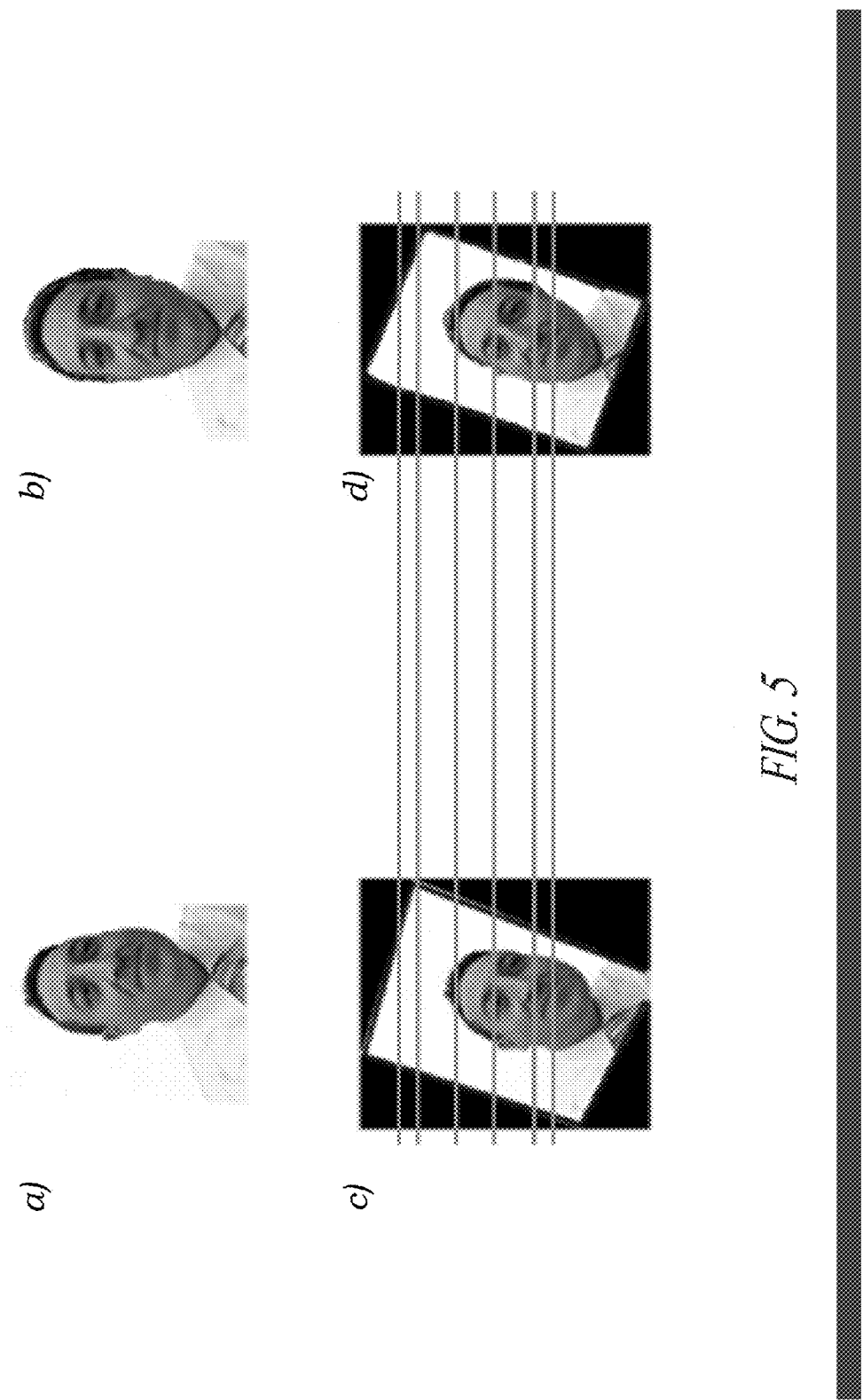
FIGS. 5a to 5d show an example of rectification operation of two images.

In the embodiment considered, the images are also rectified at a rectification step 2006. As mentioned in the foregoing, the rectification may be performed by taking into account a KRT matrix between the cameras, where K depends on optical camera parameters (such as focal, size screen, lens distortion and so on) while RT is rotation and translation transform between the cameras. Accordingly, the KRT matrix may be constant and may be pre-computed. Substantially, during the rectification step 2006, the images are aligned, such that the features, e.g., the characteristics of the objects, are aligned on the same vertical axis, e.g., the same row. Such a rectification step is performed in most depth image generation methods rendering a more detailed description herein superfluous. Just by way of illustration, FIGS. 5a and 5b show two possible source images obtained from the cameras 10, and FIGS. 5c and 5d illustrate the images after the rectification step 2006.

In embodiments, all or part of the above mentioned steps performed during the set-up phase 2004 and the rectification step 2006 may be performed directly by the cameras 10, e.g., by means of a processing unit incorporated in the cameras 10, or the images IMG may be store already in pre-processed form, e.g., after the rectification step 2006 has been performed.

Moreover, in general, the rectification step 2006 may be performed also before the setup-phase 2004, or a first part of set-up operations 2004 may be performed before the rectification step 2006 and a second part of set-up operations 2004 may be performed after the rectification step 2006.

In the embodiment considered, the images are then processed during a matching phase 2008.

In some embodiments, the matching phase 2008 comprises an optional pre-matching step 2010 and a matching step 2012. Specifically, in various embodiments, the pre-matching step 2010 determines possible candidate pixels for the matching step 2012, thus reducing the total amount of pixels to be processed.

Thus, during the pre-matching step 2010 a subset of candidate pixels is selected, and the matching step 2012 is performed for the candidate pixels. This means that holes may be created, but these may be filled later on during a refinement phase. Thus, the pre-matching step 2010 is optional insofar as the subsequent matching step 2012 could also be performed on all pixels of the reference image.

Once the matching phase 2008 has been completed, the method may perform a filtering step 2014 and/or a refinement step 2016 before the method terminates at a stop step 2018.

Thus, generally, at least some disclosed embodiments of methods for generating a depth map DMI from a plurality of images IMG have in common that a plurality of reference pixels are selected in a first image, e.g., either all pixels or only a subset of pixels. Next, with each reference pixel is associated a respective pixel in the second image and the disparity between each reference pixel and the respective pixel in the second image is determined. Finally, a depth value may be calculated for each reference pixel as a function of the respective disparity.

In the following are described possible embodiments of the pre-matching phase 2008, the matching phase 2012, the filtering phase 2014 and the refinement phase 2016.

Pre-Matching Phase

As mentioned in the foregoing, during the pre-matching step 2010, possible candidate pixels are determined for the subsequent matching step 2012, thus reducing the total amount of pixels to be processed.

In various embodiments, the pre-matching phase may include at least one of a "pixel test" and/or a "gradient test".

Substantially, in both tests, a block of pixel is selected, such as a 5×5 or 9×9 block of pixels, centered on a respective candidate pixel in the reference image.

During the pixel test, the average luminosity value is calculated for this block of pixels and associated with the reference pixel. Next, this value associated with the candidate pixel is compared with the pixels in the second image. Specifically, the value of the candidate pixel is compared with equivalent values calculated for the pixels in the second image, e.g., an average luminosity calculated for a block of surrounding pixels having the same dimension. In some embodiments, the pixel is only compared with pixels in the second image, which belong to the same row. Moreover, in some embodiments, the scan is not performed for all blocks belonging to the same row, but only to a subset of pixels in the row, because there is a limited range disparity.

Thus, during the single pixel test, only those candidate pixels are maintained or selected for which exists at least one pixel in the second image which has a similar luminosity behavior for the surrounding pixels, e.g.:

in case the absolute difference between the average luminosity values is below a threshold, the pixel is maintained or selected, or in case the absolute difference between the average luminosity values is above or equal to the threshold, the pixel is removed or not selected.

For example, for typical images, 50% to 75% of pixels may be removed or not selected early, and the speed is about 2-3 times faster.

Generally, the single pixel test may be performed starting from the first image and/or the second image, thus reducing the pixels in the first and/or second image which are available or selected for the subsequent matching operation.

Conversely, during the gradient test, the average gradient of the block of pixels surrounding the current candidate pixel is calculated and compared with a threshold. Thus, the gradient test may be used to determine if the block is too homogeneous, e.g., candidate pixels having an average gradient which is below a given threshold are skipped. In fact, in this case too many candidates may be generated, which contain only little information.

Generally, also the gradient test may be performed for the first image and/or the second image, thus reducing the pixels in the first and/or second image which are available for the subsequent matching operation.

Matching Phase

In the following will be described by way of example a matching of two images, wherein the left image is assumed to be the reference image. Those of skill in the art will appreciate that the matching phase may be extended also to more than two images, and to cases where another image is assumed to be the reference image.

In some embodiments, a modified block matching method is performed during the matching phase 2012, which will be called in the following "masked block matching". Substantially, also in this case, for each candidate pixel in the reference image is determined a block of surrounding pixels, such as a 9×9 block of pixels being centered on the respective reference pixel. Each block of pixels in the reference image is then compared with possible blocks of pixels in the second image in order to determine the block of pixels in the second image which matches best the block of pixels in the reference image.

In some embodiments, the reference block, e.g., the block of pixels centered on the candidate pixel in the reference image, is only compared with blocks of pixels in the second image, which belong to the same row. Moreover, in some embodiments, the scan is not performed for all blocks belonging to the same row, but only to a subset of pixels in the row, because there is a limited range disparity.

In some embodiments, the masked block matching 2012 is able to operate in different modes, which may also be used independently.

Figure 6:
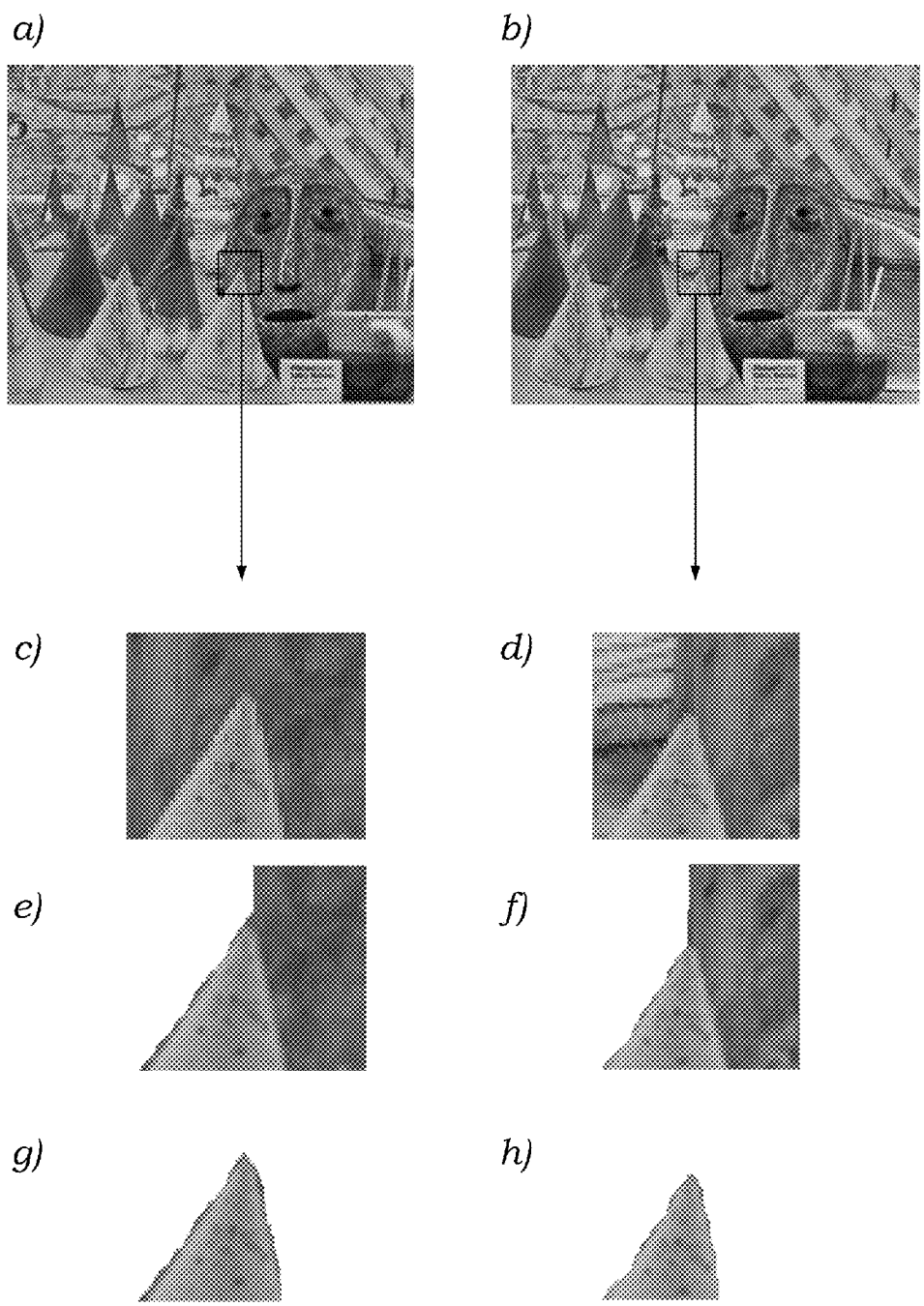
FIGS. 6a to 6h, 7, 8a, 8b and 8c illustrate various aspects of an embodiment of a matching operation.

Some differences between the various modes of operation will be described with respect to FIGS. 6a to 6h, wherein FIGS. 6a and 6b show the images of FIGS. 1a and 1b and FIGS. 6c and 6d show two possible blocks of pixels takes from the images of FIGS. 6a and 6b.

The first mode of operation is the simplest case called "no mask" and corresponds substantially to the conventional block matching method. Substantially, in this mode of operations all pixels of the blocks are used for matching, e.g., to calculate a matching cost function.

The second mode of operation is called "single mask" and facilitates managing occlusions. Substantially, this mask determined the intersection between the left and right block, e.g., the pixels having similar values. For example, in some embodiments, a SAD (Sum of Absolute Differences) is computed between them and the subset of pixels that have a value lower than a threshold are used to build the mask. Accordingly, after applying the mask, pixels with similar values remain, e.g., occlusions are masked, and the cost function is only calculated for the remaining pixels. For example, FIGS. 6e and 6f show respectively examples of the blocks shown in FIGS. 6c and 6d after the application of a "single mask" filter.

The third mode of operation is called "double mask". Substantially, this mask determines the pixels of a block which have a similar color as the central pixel of the block. For example, in various embodiments, the greyscale value of each surrounding pixel in the block is compared with the grayscale value of the pixel at the center of the block, and when the difference between these values exceeds a give threshold, the respective pixel is masked. Thus, the subset of the pixels of the block remain, which have a similar color as the central pixel. The inventor has observed that this mask manages better occlusions if the background has a different color, which is typical for borders and thin objects. Generally the double mask filter may be applied independently from the single mask filter, however, the inventor has observed that performance improves when the double mask filter is applied to the block of pixels in combination with and after the single mask filter. For example, in an embodiment, the "single mask" criteria and the "double mask" criteria are calculated independently and a logic operation, such as a AND operation, is used to determine the final combined mask, e.g., the subset of pixels which should be maintained by both masks.

For example, FIGS. 6g and 6h show respectively examples of the blocks shown in FIGS. 6e and 6f after the application of a "double mask" filter.

Thus, in the embodiments described in the foregoing, the matching operation at step 2012 is performed on blocks of pixels by selecting for each candidate pixel in a first image, e.g., the reference image, a block of surrounding pixels centered on the candidate pixel, such as a square of pixels, e.g., a 9×9 block of pixels. As mentioned in the foregoing, the number of possible candidate pixels may also be reduced via a pre-matching operation at a step 2010. This block of pixel is compared with respective blocks of pixels with the same dimension in the second image, which usually belong to the same row (or possibly also to adjacent rows) in order to determine the block of pixels in the second image, which matches best the block of pixels in the first image. For example, in various embodiments, the combination of blocks of pixels is selected which minimizes a given cost function. For example, the cost function may be based on the calculation of the mean square error (MSE) or sum of absolute differences (SAD) between the values of the respective pixels in the blocks.

More specifically, in the embodiments described in the foregoing, a mask may be applied to the blocks of pixels in order select a subset of the pixels of the blocks which satisfy certain criteria, e.g., certain pixels may be removed from both blocks of pixels if these do not satisfy certain criteria. In this case, the matching, e.g., the calculation of the cost function, is only performed on the remaining pixels, e.g., the subset of pixels which have not been removed by the masking operation.

Figure 7:
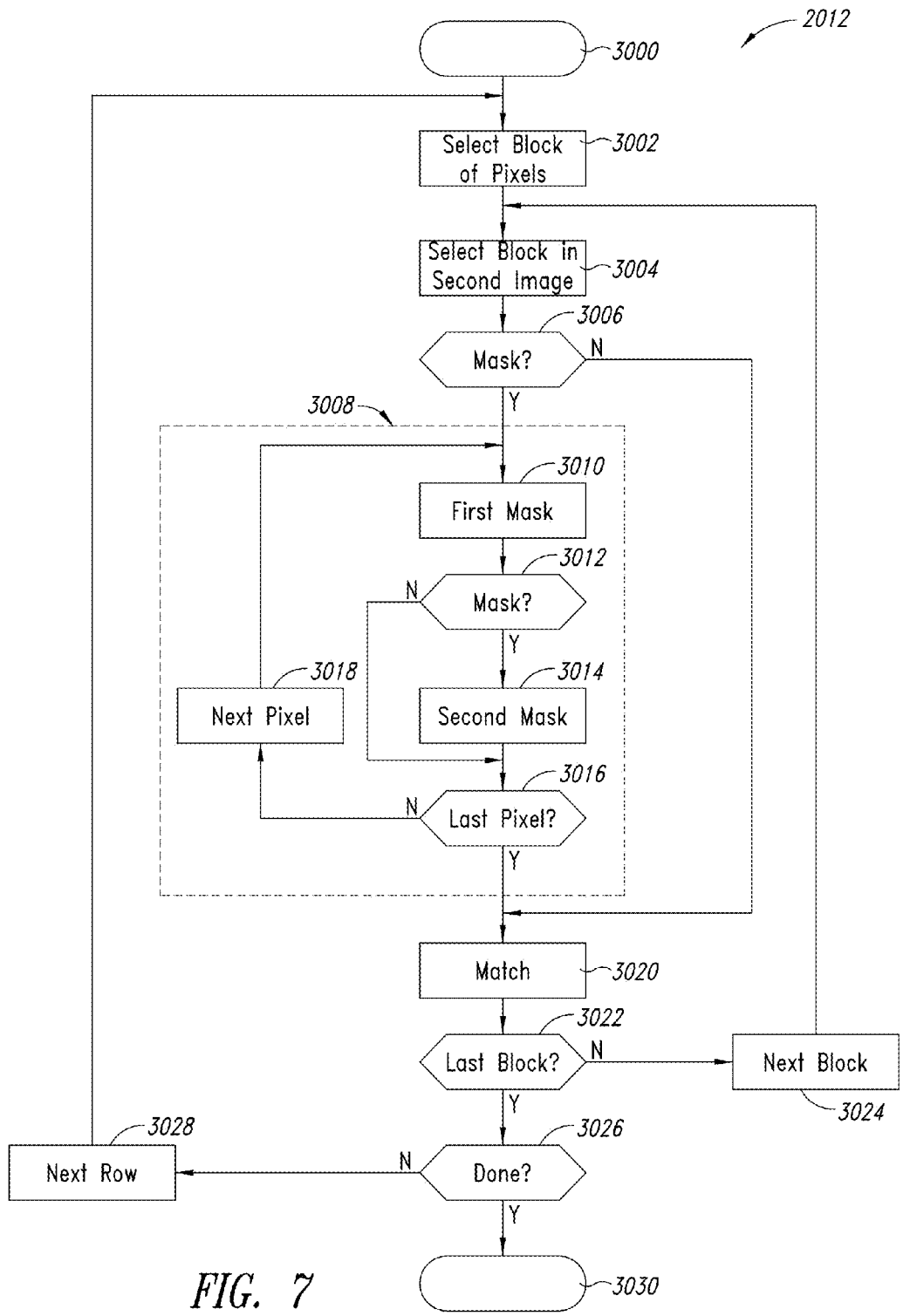

FIG. 7 shows a flow chart of a possible embodiment of the matching phase 2010, which supports all three masking operations. Specifically, FIG. 7 shows an embodiment, wherein the matching operation is performed for all pixels in the second image, which belong to the same row as the candidate pixel. However, as mentioned in the foregoing, also adjacent rows could be used and/or the range of pixels in a row of the second image could be limited.

After a start step 3000, the method selects at a step 3002 a square of pixels, such as a 9×9 block of pixels which is centered on the current candidate pixel.

At a step 3004, the method selects for the current pixel in the second image a square of pixel with the same dimension as the square of pixel selected at step 3002.

At step 3006, the method determines whether at least one masking operation is to be performed.

In case no masking has to be performed (output "N" of the determining step 3006), the method proceeds directly to a matching step 3020, which will be described later on.

Conversely, in case masking has to be performed (output "Y" of the step 3006), the method performs at least one masking operations at a step 3008.

Substantially, during the masking operations one or more masks are applied to select a subset of pixels of each pixel block. For example, in the embodiment considered, at least one masking criterion is applied to each pixel of the pixel block. For example, in various embodiments, pixels are masked by creating an array of control information, which has the dimension of a block of pixels, such as a 9×9 bit array. For example, in case a pixel is to be maintained the value in the array of control information may be set to a first value, e.g., the logic value "1", and in case a pixel is to be removed the value in the array of control information may be set to a second value, e.g., the logic value "0".

For example, in the embodiment considered, a first mask, e.g., the "single mask", is applied to the current pixel of the pixel block at a step 3010.

For example, in an embodiment, the method may calculate at the step 3010 the difference between the values of the respective pixels of the blocks in the first and second image, e.g., the difference between the luminance values of the pixels, and compare the difference with at least one threshold value. For example, in an embodiment, the method determines for the pair of pixels whether the absolute difference between the luminance values of the pixels is below a given threshold, and:

in case the absolute difference is below the threshold, the pixel is maintained, or in case the absolute difference is above or equal to the threshold, the pixel is removed.

In some embodiments, instead of using the difference between the luminance values, a sum of absolute differences between the color values is used, such as, e.g., a sum of absolute differences between the RGB color values.

Next, the method may determine at a determining step 3012 whether a second masking operation is to be performed for the current pixel.

In case a further masking is to be performed (output "Y" of the step 3012), the method applies at a step 3014 a second mask, e.g., the "double mask".

For example, in an embodiment, the method may calculate at the step 3014 the difference between the value of the respective pixel and the value of the central pixel of the block. For example, the difference between the luminance values of the pixels may be calculated or preferably the sum of absolute differences between the color values may be used, e.g., the values of a RGB image. Again this difference, absolute difference or sum of absolute difference may be compared with at least one threshold value, and, e.g.:

in case the absolute difference is below the threshold, the pixel is maintained, or in case the absolute difference is above or equal to the threshold, the pixel is removed.

Also in this case the pixels to be removed may be identified by setting the value in the array of control information to the second value, e.g., the logic value "0".

Generally, the above described second masking operations may be performed for the block of pixels of the first and/or the second image. However, in some embodiments the above described second masking operation may be limited to the reference image. In fact, as mentioned in the foregoing, the "single mask" criteria and the "double mask" criteria may be calculated independently and a logic AND operation could be used to determine the final combined mask. Thus, in this case, the "double mask" criteria could be calculated only once for a given candidate pixel in the reference image, and only the "single mask" criteria would be calculated for the selected range of pixels in the second image.

Once the one or more masks have been applied to the current pixel of the block (e.g., output "N" of the step 3012 or directly after the second masking operation at step 3014), the method determines at a step 3016 whether the pixel is the last pixel of the block of pixels.

In case the pixel has not been the last pixel in the block of pixels (output "N" of the step 3016) the method selects the next pixel of the block at a step 3018 and repeats the masking operations at the step 3010.

Conversely, in case the pixel has been the last pixel in the block of pixels (output "Y" of the step 3016) the method proceeds to a step 3020 for performing the matching operation.

In some embodiments, the method calculates at the step 3020 a cost function taking into account only the pixels, which have not been removed by the masking operations (e.g., considering the subset of selected pixels). Generally, any block matching cost function could be used for this purpose, for example those shown in Table 1 the above referenced article "*A Taxonomy and Evaluation of Dense Two-Frame Stereo Correspondence Algorithms*" from Scharstein et al., such as square difference, cross-correlation, absolute difference, gradient based, etc.

In some embodiments, the currently best matching block in the second image for the current candidate pixel in the first image is memorized at the step 3020, e.g., the block for which the smallest result of the cost function computation has been obtained. For example, the currently best result of the cost function computation may be stored and in case the current computation of the cost functions provides a lower result, the memorized block may be replaced with the current block of pixels, or in general a signal which permits to identify this block of pixels, such as the column (and possible the row) associated with the center pixel of the block. Moreover, as will be described in greater detail in the following, the matching phase may not select only the best matching block, but may provide a plurality of candidate blocks or respective candidate pixels in the second image which have a low error.

Next, the method determines at a step 3022 whether the current block of pixels has been the last block in the row of pixels of the second image.

In case the respective center pixel has not been the last pixel in the row of pixels (output "N" of the step 3022), the method selects at a step 3024 the next pixel of the row in the second image and the method proceeds to step 3004, e.g., the above steps are repeated for all pixels belonging to the same row in the second image.

In case the pixel has been the last pixel in the block of pixels (output "Y" of the step 3022), the method proceeds to a step 3026.

Substantially, the method determines at the step 3026 whether all candidate pixels have been processed.

Thus, in case the candidate pixel has not been the last candidate pixel (output "N" of the step 3026), the method selects at a step 3028 the first pixel of the row in the second image and the next candidate pixel.

Conversely, in case the candidate pixel has been the last candidate pixel (output "Y" of the step 3028), the matching phase terminates at a stop step 3030.

Thus, in the embodiment considered, the matching operation at step 3022 is performed for the same block of pixels currently processed by the masking operation at step 3008. However, generally, the matching operation could also be performed independently from the masking operation.

Figure 1A:
FIGS. 1a, 1b, 1c and 2 have already been described in the forgoing.
Figure 1B:
Figure 8A:
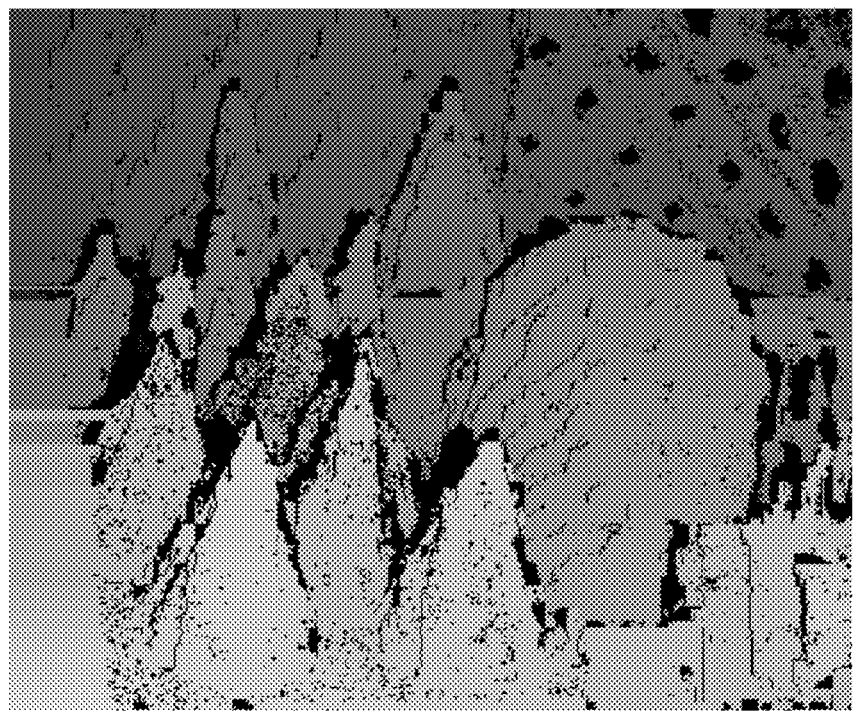
Figure 8B:
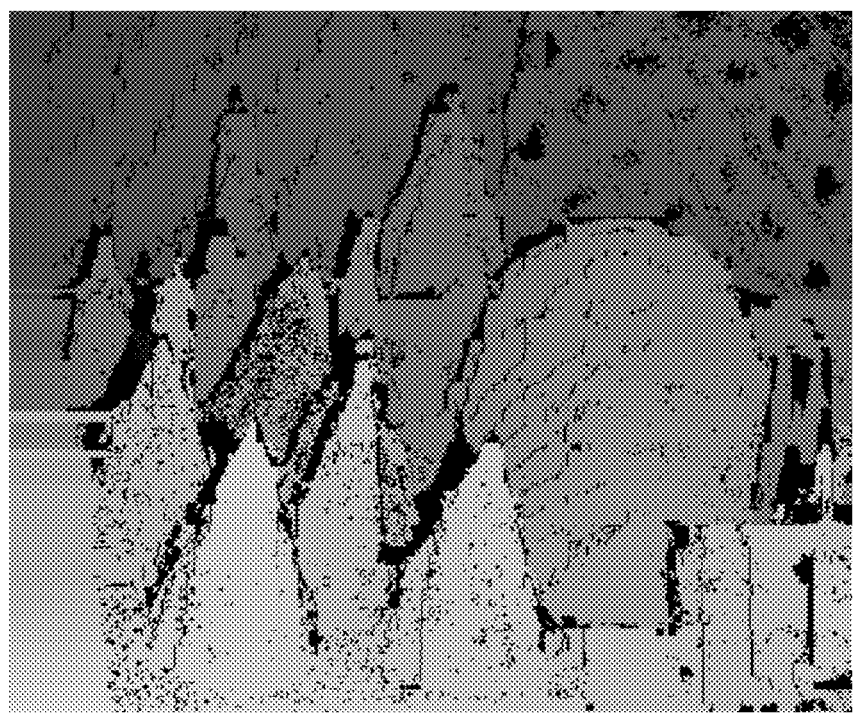
Figure 8C:
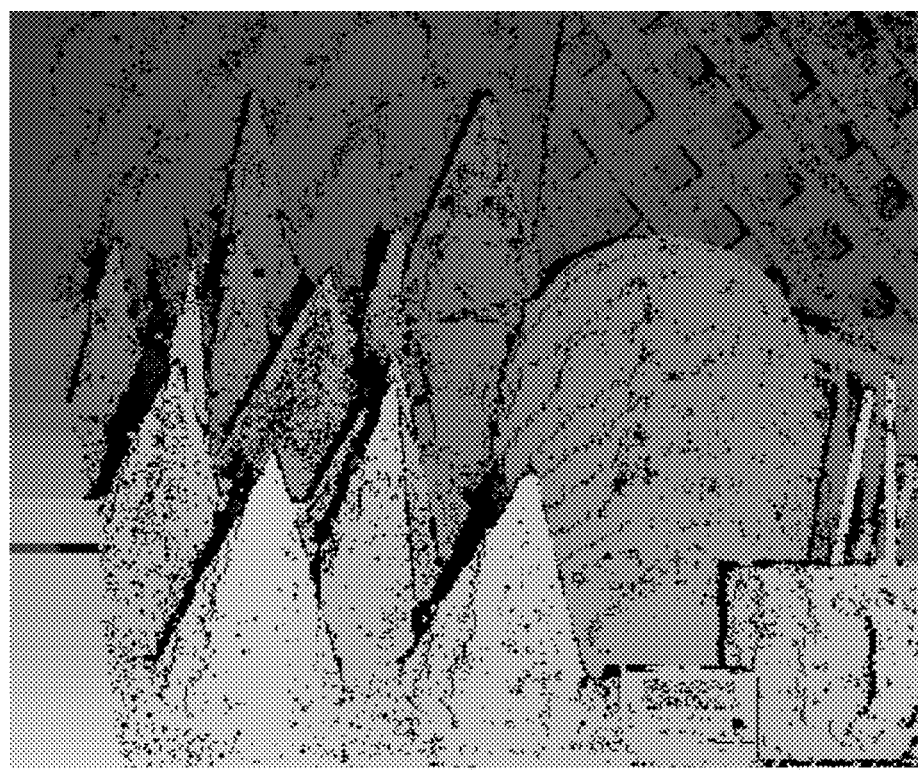

FIGS. 8a to 8c show in this respect possible depth map images of the images shown in FIGS. 1a and 1b, wherein respectively no mask, the single mask and the combination of single mask and double mask has been applied.

Filtering Phase

As mentioned in the foregoing, in various embodiments, the matching phase 2008 does not merely select the best matching block in the second image, as it is usual for local methods, but multiple candidate blocks with a low error are associated with each candidate pixel and processed by the filter stage 2014.

Generally, the number of pixels in the second image associated with each candidate pixel in the reference image may be fixed or variable. For example, only those pixel pairs may be selected for which the respective result of the cost function is below a given threshold. For example, in some embodiments, this threshold value and/or a maximum number of pixel pairs are configurable.

In some embodiments a DLEM (Disparity Local Energy Min) filter stage is used for the final selection and also for an outliers removal.

The filter may be based on the following energy function:

$$E(d)=E\text{data}(d)+\lambda E\text{smooth}(d)$$

Specifically, in some embodiments, the calculation of the above equation is split into two separate cost functions:

$$E1(d)=E\text{data}(d)$$

$$E2(d)=E\text{smooth}(d)$$

In some embodiments, the first cost function E1(d) is used during the matching phase, e.g., during the step 3020 shown in FIG. 7. Thus, the matching phase 2008 provides a plurality of possible solutions representing the most similar pixel blocks between the two images, e.g., at the end of matching multiple candidate pixels in the second image are associated with each pixel of the reference image or the subset of pixels in case a pre-matching or another operation has been performed to reduce the number of pixels used during the matching phase.

Conversely, the second cost function is used during the filter step 2014 to define a weight for the final cost function. The filter stage modifies the result of the first cost function E1(d) and selects the best association for each pixel. For example, the pair of pixels may be selected, which has the lowest value of the modified cost function.

In some embodiments, an outliers removal may be performed before the final selection is done in order to reduce to risk of wrong selections. For example, such an outliers removal may be performed based on disparity neighbors values.

Figure 9:
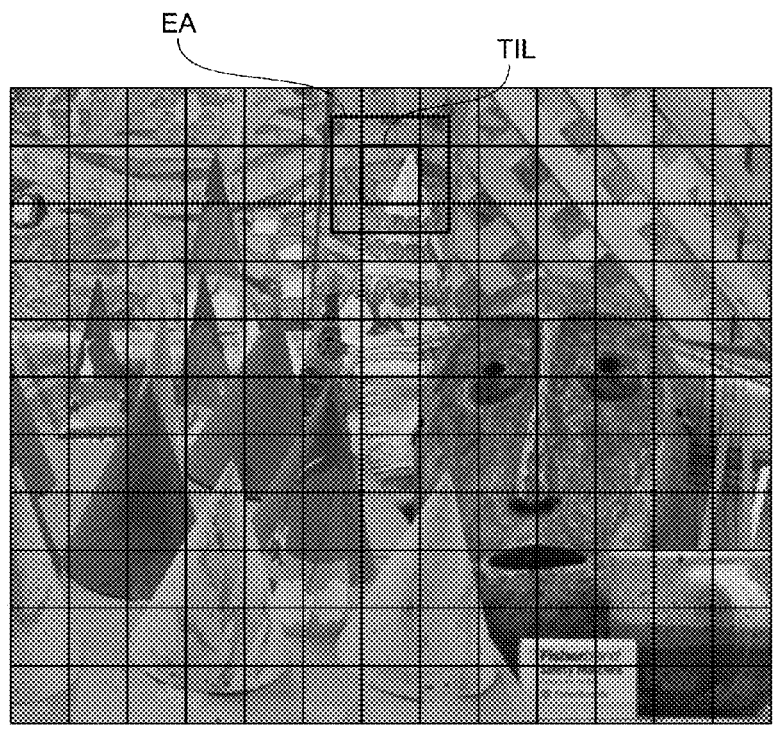
FIGS. 9, 10a, 10b, 11a and 11b illustrate various aspects of an embodiment of a filtering operation.

For example, in an embodiment, the image is divided into square tiles, such as 32×32 or 16×16 blocks of pixels. For example, FIG. 9 shows an example wherein the tiling operation has been applied to the reference image of FIG. 1b. For example, in FIG. 9 is highlighted one of the titles TIL.

In the embodiment considered, a disparity histogram is built for each tile TIL only with the disparity values of the candidates belong to the respective tile.

Figure 10:
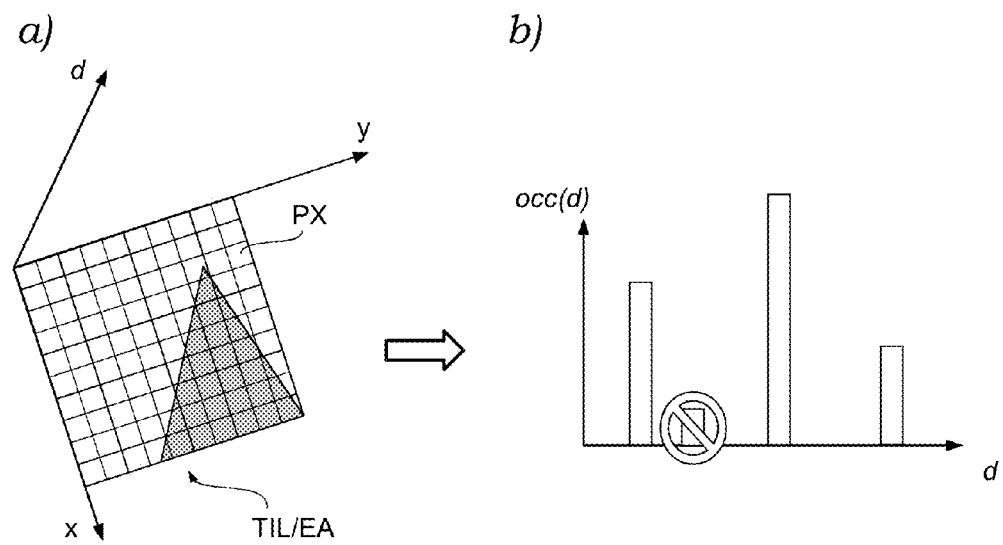

For example, FIG. 10a schematically shows the tile TIL of FIG. 9, which comprises, e.g., a 10×10 block of pixels. Specifically, with each pixel PX of the tile TIL is associated a number of candidate pixels, and as mentioned in the foregoing, the number of candidate pixels could be fixed or variable. Moreover, with each pixel pair is associated a disparity or depths value d.

These disparity or depths values d for each pixel PX are used to build a histogram of disparity. Specifically, the histogram shows the occurrences of the disparity or depths value d for all pixels in the tile TIL. For example, in case 4 candidate pixels would be associated with each pixel PX of the 10×10 tile TIL, a total of 400 values would be distributed in the histogram. Thus, the histogram of disparity per tile permits to discover the outliers. In fact, even when a matching is very good from a similarity point of view, the association could not be the correct one. In fact, as shown in FIG. 10b, it is possible to recognize as outliers the candidates with low occurrences in the histogram.

In the embodiment considered, the histogram is then used to modify the results of the cost function calculated during the matching phase. For example, in an embodiment, the occurrences occ(d) are used as the inverse weight of cost function. Accordingly, high occurrences decrease the cost function, so also a non-minimum original cost value could win:

$$E2(d) = \frac{E1(d)}{occ(d)}$$

Accordingly, in the embodiment considered, during the matching phase is determined for a given pair of pixel a disparity value d and a respective cost function E1(d). Conversely, during the filtering phase is determined the occurrence occ(d) of the disparity value d in the whole tile TIL associated with the respective pixel, and the occurrence occ(d) of the disparity value d is used to weight the initial cost function.

For example, considering the exemplary case wherein 4 candidate pixels having the following disparity values are associated with a pixel in the reference image:

the first pixel pair has a disparity d=4 and a cost function E1=20;
the second pixel pair has a disparity d=5 and a cost function E1=30;
the third pixel pair has a disparity d=6 and a cost function E1=15; and
the fourth pixel pair has a disparity d=7 and a cost function E1=25, the disparity value d=6 would have the lowest value for the cost function E1.

Now, considering that the histogram for the respective tile would show the following occurrences for the above mentioned disparity values d:

occ(4)=4;
occ(5)=2;
occ(6)=5; and
occ(7)=25.

Accordingly, the modified cost function would have as final result:

E2(4)=20/4=5;
E2(5)=30/2=15;
E2(6)=15/5=3; and
E2(7)=25/25=1.

Thus, the filter stage would select indeed the fourth pixel pair with the disparity value d=7, which has the lowest value for the modified cost function.

Figure 11A:
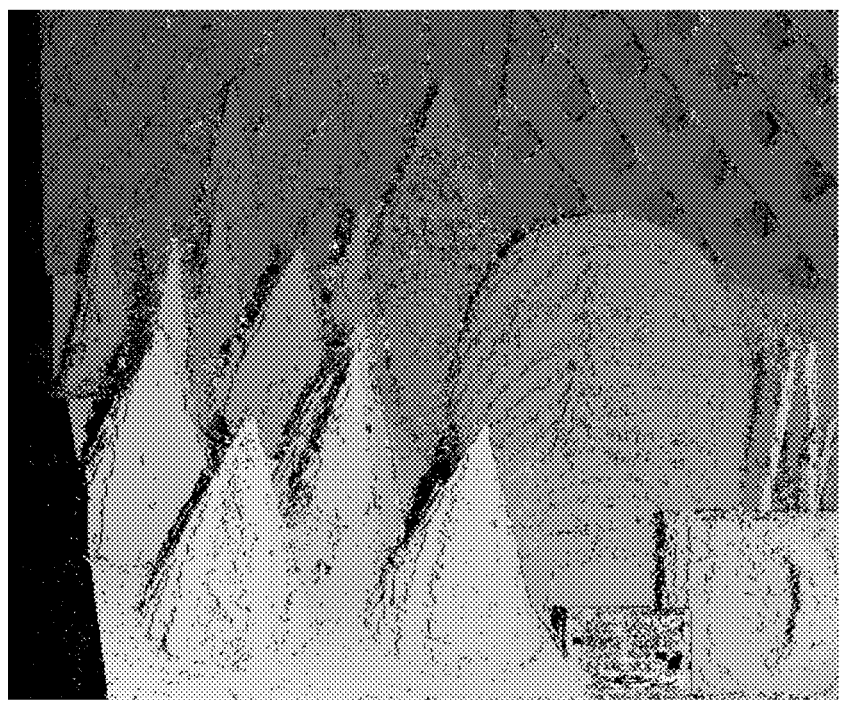
Figure 11B:
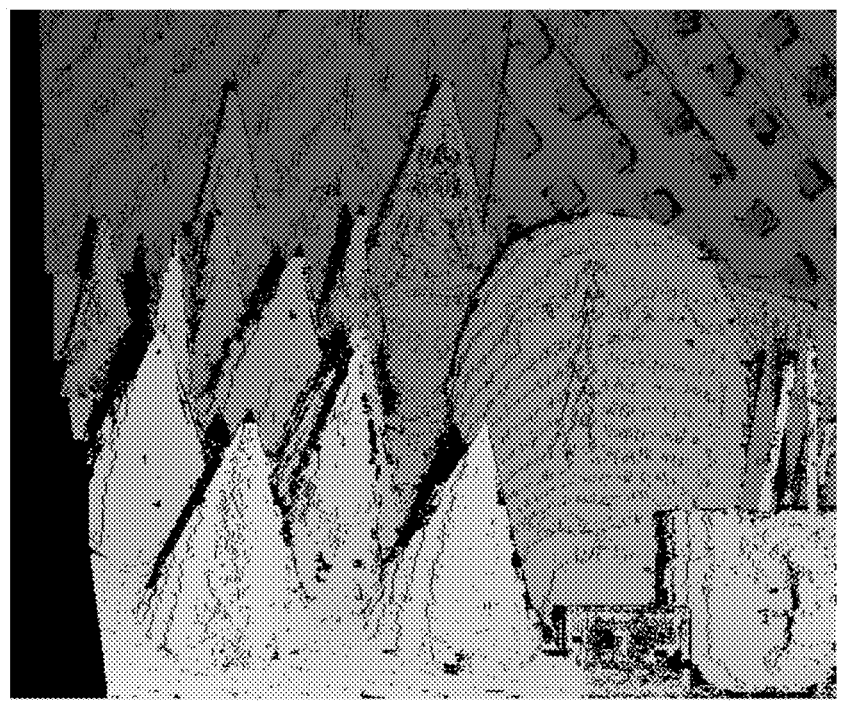

For example, FIGS. 11a and 11b show respectively possible depth map images of the images shown in FIGS. 1a and 1b, wherein only the best matching block has been selected or the DLEM filter described in the foregoing has been applied.

Thus, in the embodiment considered, it is not required to define a X value for the global energy function. In fact, usually, it is difficult to establish the X value, because the contributions Edata(d) and Esmooth(d) usually have different measurement orders.

In an embodiment, the histogram of disparity is not merely generated for the current tile TIL, but an enlarged area EA is used for this purpose. For example, as shown in FIG. 9, the tiles TIL may be 16×16 pixel blocks, but for each tile may be used a larger block EA, such as a 32×32 block of pixels, which is used to determine the histogram of disparity. Specifically, this enlarged area is used to calculate via the histogram the occurrences of the disparity values d, but the final selection is only performed for the pixels of the smaller tile TIL. Moreover, in the extreme case, also the tile dimension could be set to 1×1, e.g., for each pixel could be determined a respective histogram based on the surrounding pixels.

Thus, in the embodiment considered, the matching operation selects a plurality of candidate pixels in the second image which best match the reference pixel and with each candidate pixel is associate a respective cost function value and a respective disparity value. Next, the DLEM filtering operation selects for each reference pixel a respective best candidate pixel among the plurality of candidate pixels in the second image. Specifically, the DLEM filter selects a plurality of pixels in the vicinity of the reference pixel, e.g., the tile TIL or the enlarged area EA. Next, the DLEM filter determines the occurrences occ(d) of the disparity values d associated with the candidate pixels of the pixels in the vicinity of the reference pixel. Finally, the DLEM filter selects the candidate pixel in the second image as a function of the respective cost function value associated with each candidate pixel and the occurrence occ(d) of the respective disparity values (d) associated with the candidate pixel.

Generally, instead of generating a single histogram for the Luma values, e.g., grayscale values, it is also possible to perform a color segmentation that gives multiple histograms, one for each color. In this case the weight and selection could also be different for each color.

Refinement Phase

In embodiments, the method may improve the final depth map image at the refinement step 2016.

For example, usually, after the matching phase 2008 or after the filter step 2014 each left pixel is associated only with one right pixel, but this may not always be true in the opposite direction. In fact, multiple right pixels could be associated with a pixel of the left image.

Generally, this problem could be avoided by performing also a matching of the right image to the left image.

Conversely, in an embodiment, an univocal test is applied to discover multiple associations and using the cost function of the matching phase 2012 (or possibly the cost function modified during the filter step 2014) to determine the best association between left and right pixels.

Moreover, in various embodiments, hole filling and/or border adjustment may be performed.

Substantially, during this refine operation the last unmatched pixels may be filled. For example, the color of neighboring pixels may be considered to associate the same depth to similar pixels. It may also be tested whether there is a high depth gap and a different color. For example, in this case the lowest value may be taken to manage occlusions. In the opposite case, a linear interpolation may be applied. Finally, also the pixel having already associated a depth value may be adjusted with the same criteria.

Figure 1C:
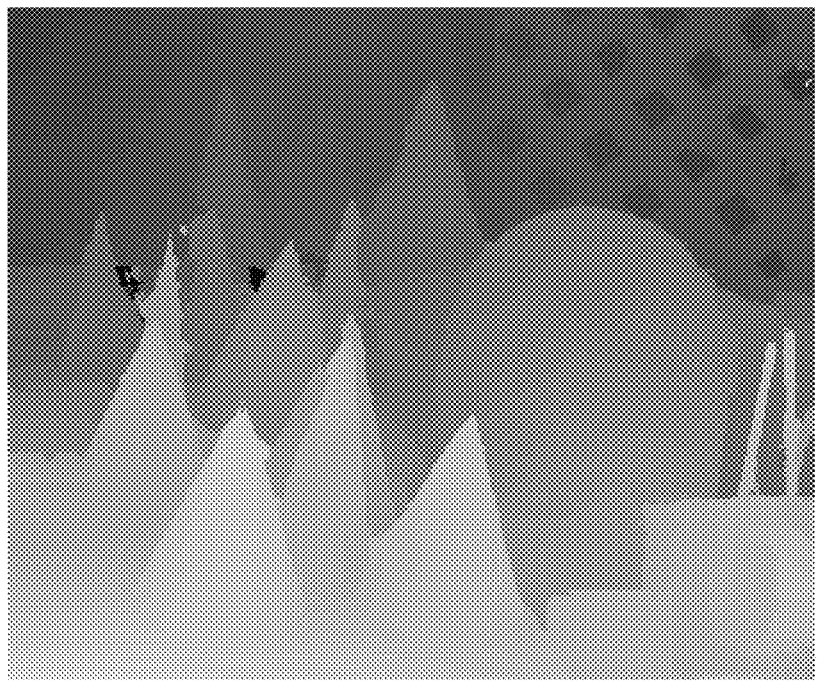
Figure 2:
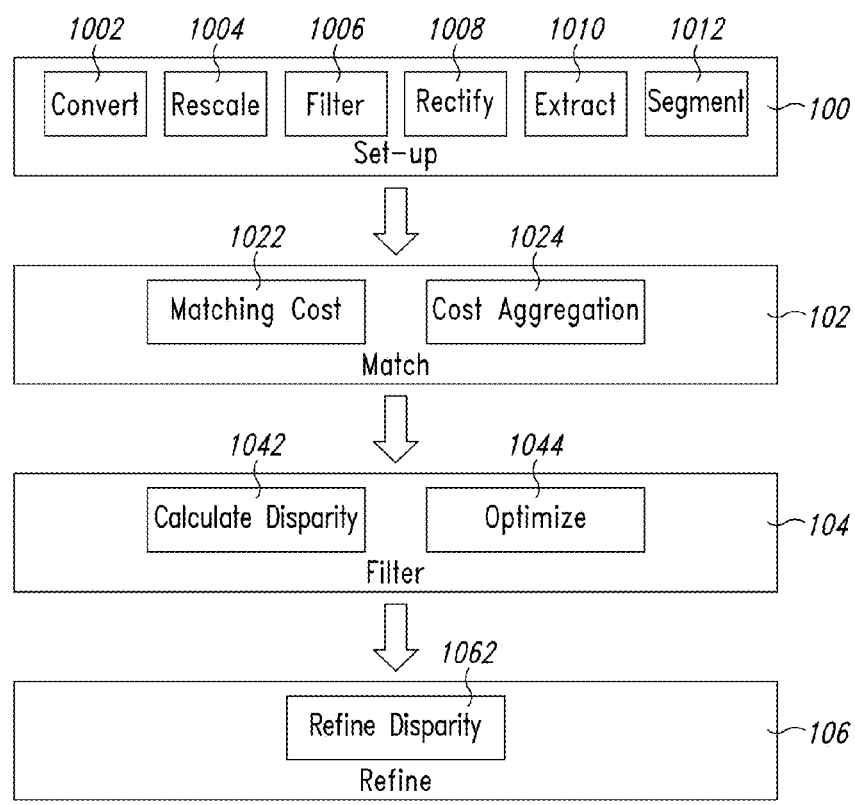

For example, FIG. 1c shows a possible result of the depth map image after the refinement step 2016.

Processing Speed Improvements

One of the main problems of depth map generation is the processing speed which may be critical for real time applications. The above described methods, while permitting the generation of high quality depth images, include already mechanisms which may facilitate reducing the processing time, such as the pre-matching phase 2010 reducing the number of candidate pixels, and the possibility to execute several operations in parallel, such as, e.g., the pre-matching 2010 and the matching operation 2012.

Moreover, the article "A Taxonomy and Evaluation of Dense Two-Frame Stereo Correspondence Algorithms" cited in the forgoing describes various other methods to improve processing speed, which could be combined with the methods disclosed herein. For example, the original images IMG could be down-scaled and the estimated depth map DMI could be up-scaled again. Moreover, a pyramidal approach could be used, in which the images IMG are down-scaled several times to have pyramidal levels, which represent versions of the same image with different resolutions. Then the matching operation 2008 could be repeated for all pyramidal levels starting from the smallest image up to the biggest to have depth map with higher precision. In this case, processing speed may be improved by taking into account the result of the matching operation of the previous layer, such as limiting the matching operations only to a range of pixels in vicinity of the pixel (or pixels) found for the lower level matching operation.

Figure 12:
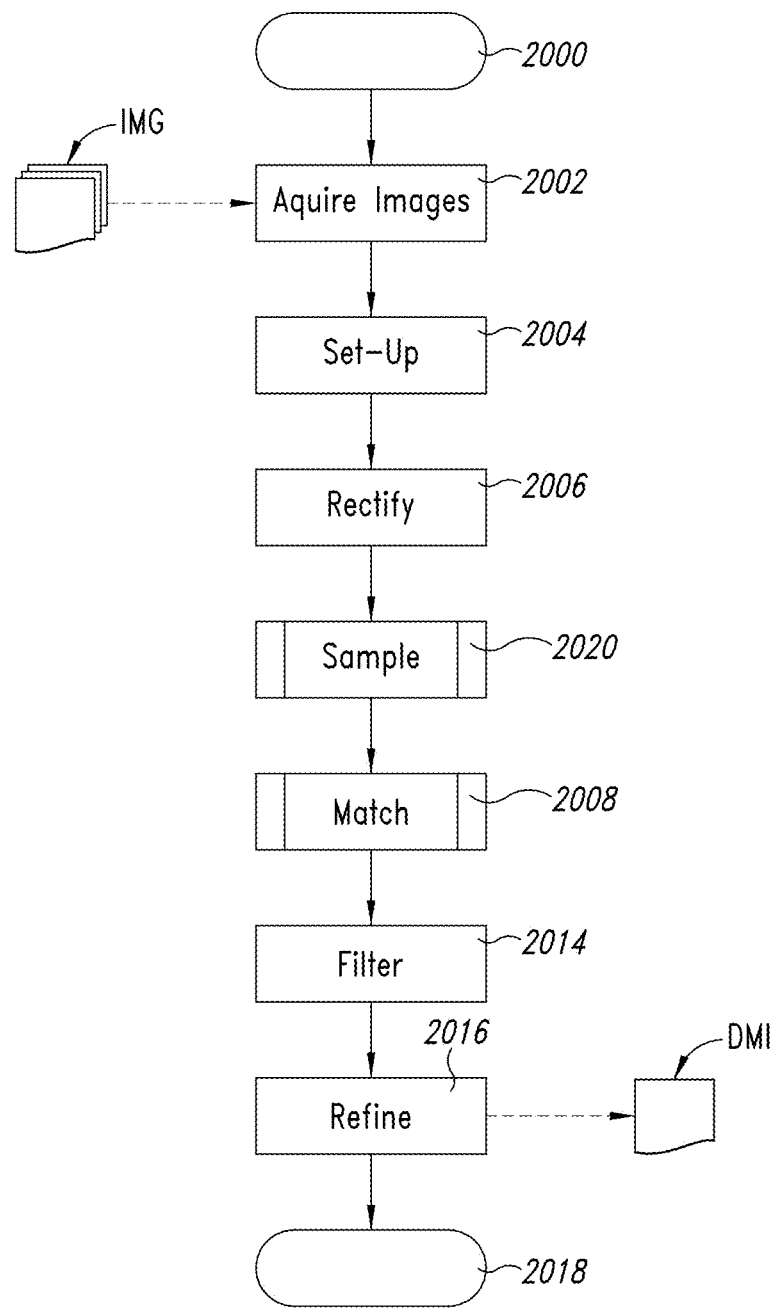
FIG. 12 is a flow-chart showing a second embodiment of a method for estimating depth maps.

FIG. 12 shows in this respect an embodiment of a method for depth image estimation which may facilitate improving processing speed.

Substantially, the embodiment is based on the general architecture of a depth map estimation process described with respect to FIG. 4. Thus, the method may comprise also in this case an image acquisition step 2002, a set-up phase 2004 and a rectification step 2006, and part or all of these operations could be performed directly by the camera 10 or during an off-line pre-processing.

However, in the embodiment considered, the matching phase 2008 is not performed on all pixels, but only for a subset of pixels in the reference image, e.g., a reduced number of samples. Accordingly, such a sampling operation is different from a simple downscaling operation, because the sampling operation reduces the number of pixel only for the reference image, e.g., the left image, while the number of pixels of the second image remains unchanged.

Accordingly, a sampling step 2020 is introduced before the matching phase 2008, during which a sampling operation is performed.

Figure 13:
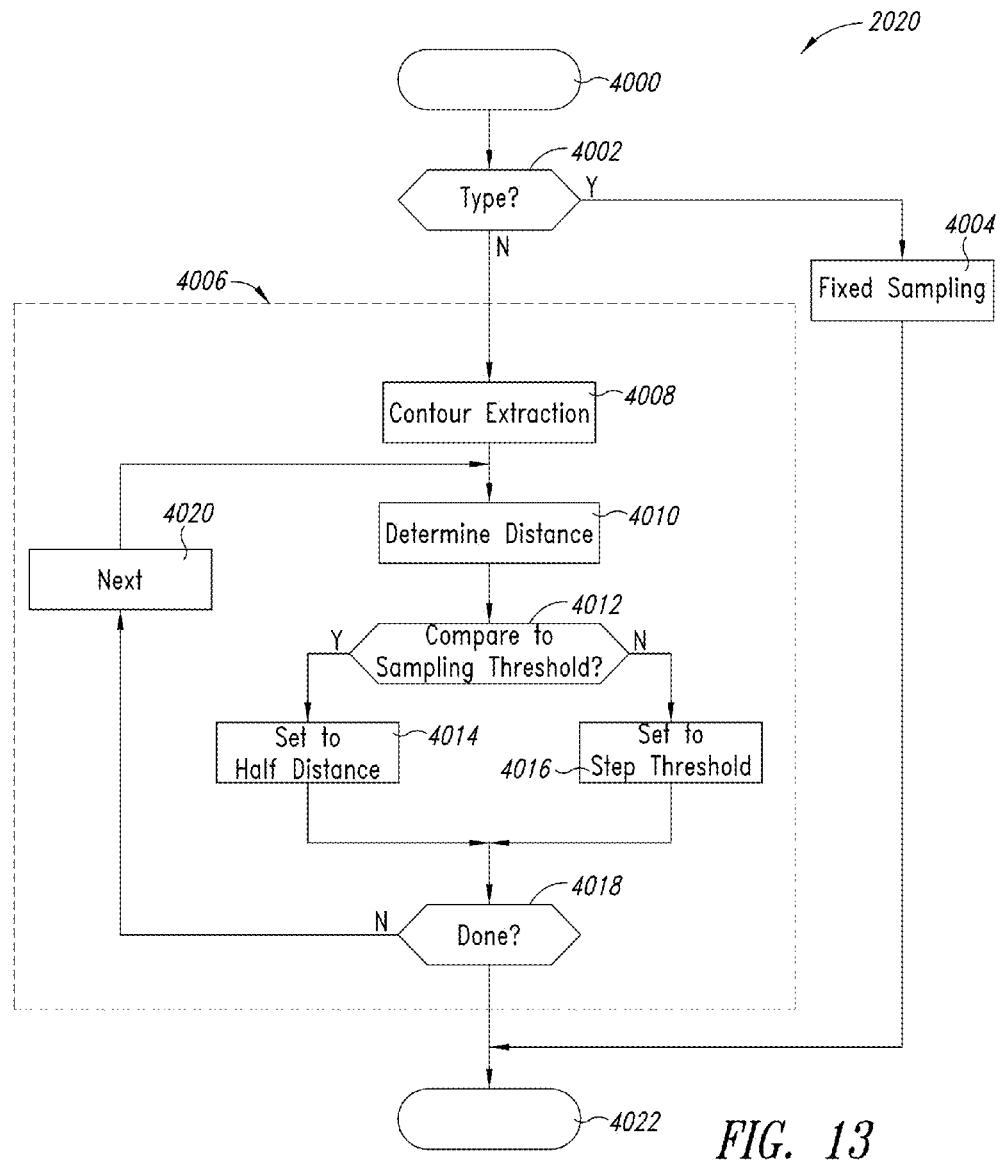
FIGS. 13, 14, 15a, 15b, 16a and 16b illustrate various aspects of an embodiment which facilitates improving the processing speed of the depth map estimation.

FIG. 13 shows in this respect a possible embodiment of the sampling operation 2020.

Specifically, in the embodiment shown in FIG. 13, two sampling methods are supported, which however could also be used independently:

fixed sampling; and adaptive sampling.

Specifically, after a start step 4000, the method determines at a step 4002 whether fixed sampling or adaptive sampling is to be performed.

In case fixed sampling is to be performed (output "Y" of the step 4002), the method proceeds to a fixed sampling step 4004.

Substantially, during the step 4004, the image is divided in blocks of pixels having a give dimension $s_h \times s_v$, such as a square of N×N pixels, and wherein only one pixel of each block, such as the central pixel, is used for the matching operation 2008. For example, the step 4004 may be implemented by selecting only each $s_v$-th row of the image, and for each selected row, only each $s_h$-th pixel (e.g., column) is selected. Accordingly, in the fixed sampling method, a fixed array or regular grid of pixels is usually selected.

Conversely, in case adaptive sampling is to be performed (output "N" of the step 4002), the method proceeds to an adaptive sampling step 4006.

Specifically, during adaptive sampling, the sampling step in at least one sampling direction is not fixed, but variable.

Figure 15A:
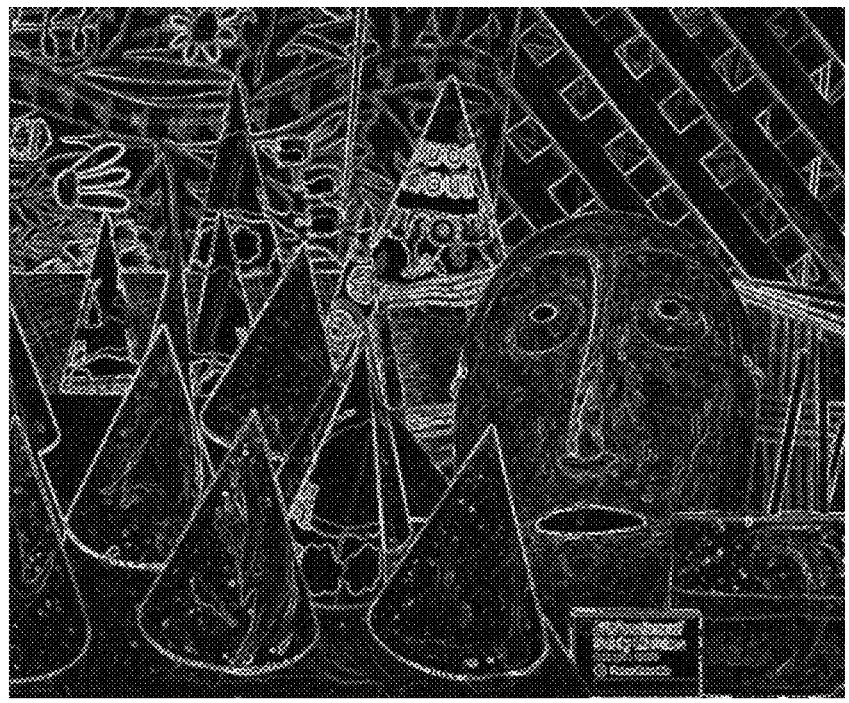

In the embodiment considered, in order to determine the sampling step, a contour extraction method is applied to the reference image at a step 4008. For example, in an embodiment a Sobel Filter may be used to obtain the gradient YUV behavior. In fact, all channels may be considered, because in this way, the filter may be applied to each channel and then the highest gradient may be taken for each pixel. In this way most contours may be detected even when the Luma values, e.g., the grayscale values, would generate only a low gradient. For example, FIG. 15a shows an example of the image of FIG. 1a after the use of a Sobel Filter.

Figure 15B:
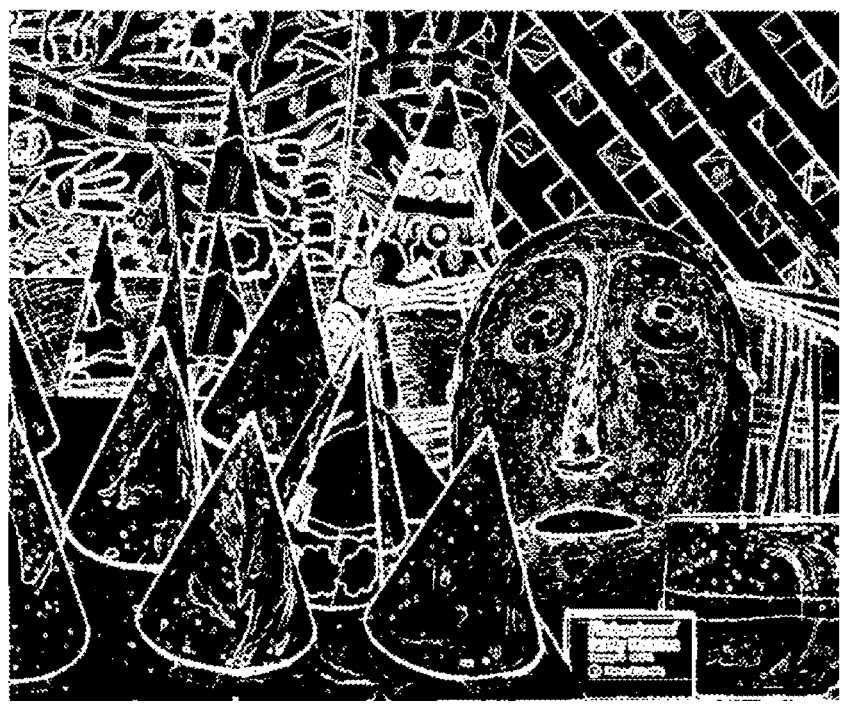

In the embodiment considered, a contour quantization may then be applied to the filtered image to have the most important features, e.g., the image is converted in a black and white image having only zero and one values. For example, FIG. 15b shows an example of the image of FIG. 15a after the quantization operation.

As mentioned in the foregoing, the sampling step in at least one sampling direction is not fixed, but variable.

Specifically, in some embodiments, the sampling step between two adjacent contours is fixed for all samples between those two contours and the sampling step, and thus the number of samples, is determined as a function of the distance between those two contours.

For example, in the following will be described an embodiment, in which the vertical sampling step is fixed and the horizontal sampling step is variable. Accordingly, in the embodiment considered, only each $s_v$-th row of the reference image may be selected. However, while during fixed sampling, also the sampling within each row was fixed, the sampling within the rows may now be variable.

In the embodiment considered, in order to determine the current horizontal sampling step $s_h$, the method determines at a step 4010 the distance $d_h$ between two horizontal contours in the image processed at step 4008.

Figure 14:
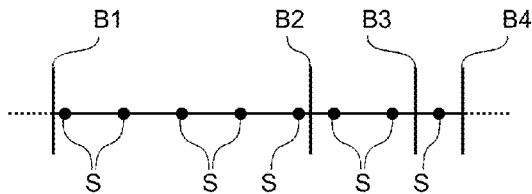

FIG. 14 shows in that respect a row in the reference image comprising four borders B1 . . . B4. Specifically, in the example shown in FIG. 14, the distance $d_h$ between the borders are:

$d_h$=22 between the borders B1 and B2;
$d_h$=9 between the borders B2 and B3; and
$d_h$=4 between the borders B3 and B4.

Next, the distance $d_h$ is compared at a step 4012 with a given threshold, which may, e.g., correspond to the value used for vertical sampling, e.g., $s_v$.

In case the detected distance $d_h$ is smaller than the given threshold (output "Y" of the step 4012), the sampling step $s_h$ is set to the half of the distance $d_h$ at a step 4014, e.g., $$s_h = d_h/2$$

For example, considering the above numerical example, the distance between the borders B3 and B4 would be 4, and thus the sampling step between these two borders would be set to $s_h$=2, e.g., a single sample S would be placed at the center between the borders B3 and B4.

Conversely, in case the detected distance $d_h$ is equal or greater than the given threshold (output "N" of the step 4012), the sampling step $s_h$ is set at a step 4016 to the given threshold, e.g., $$s_h = s_v$$

Specifically, in various embodiments, the first mod($d_h$/$s_h$)/2, e.g., the reminder of the division of $d_h$ by $s_h$ divided by two, pixels are skipped in this case in order to distribute the samples S better.

Again, considering the above numerical example, the distance between the borders B1 and B2 would be 22, and thus the sampling step between these two borders would be set to $s_h$=$s_v$. For example, in case $s_h$=5, four samples S would be placed between the borders B1 and B2 and the first pixel would be skipped. Similarly, two samples S would be placed between the borders B2 and B3 and the first two pixels would be skipped.

In some embodiments, the sampling operation is then repeated both for the next pixels in the row and for all selected rows.

For example, in the embodiment considered, the method determines at a step 4018 whether the pixel has been the last pixel of the row and whether the selected row has been the last.

In case the pixel has not been the last pixel of the row and the selected row has not been the last (output "N" of the step 4018), at a step 4020, the method jumps to the pixel position of the currently determined border or selects the next row, and performs the next sampling operation, e.g., the method returns to step 4010.

Conversely, in case the pixel has been the last pixel of the row and the selected row has been the last (output "Y" of the step 4018), the sampling operation terminates at a stop step 4022.

Thus, thin objects are sampled at least with one sample S. Conversely, such thin object could be skipped with the fixed sampling method.

The sampled pixels are then used for the matching operation 2008. For example, the matching operation 2012 disclosed with respect to FIG. 7 could be used, potentially including also the pre-matching operation 2010.

As described in the forgoing, generally, also a plurality of matching pixels could be selected and the best combination could be selected only during a subsequent filtering step 2014. However, usually, for real time applications this step could also be skipped to improve processing speed.

In any case, once the matching pixels have been determined, either by the matching operation 2008 or the filtering operation 2014, each sample of the reference image is associated with a corresponding pixel of the second image.

However, due to the sampling operation at step 2020, a lot of pixels are not matched.

Generally, these empty spaces may be filled as described in the foregoing in order to recover the missing pixels skipped during the pre-matching phase.

Thus, also in this case, a refinement step 2016 may be performed. For example, a hole filling method may be applied, which fills the empty area based on the depth values of the closest samples, e.g., directly with the depth value of the closest sample. Moreover, in case the above described masked block matching has been used, the hole filling operation could also take into account the matching mask, e.g., the shape of the objects (see, e.g., FIG. 6).

Moreover, also a border adjustment may be performed during the refinement step 2016. For example the border adjustment may be performed as a function of the RGB values of the pixels in order to associate similar depth values to pixels having similar colors.

Generally, the above described depth map estimation methods may also be modified.

For example, in various embodiments, additional filters may be applied to the original images, e.g., in order to match only important features.

Figure 16A:
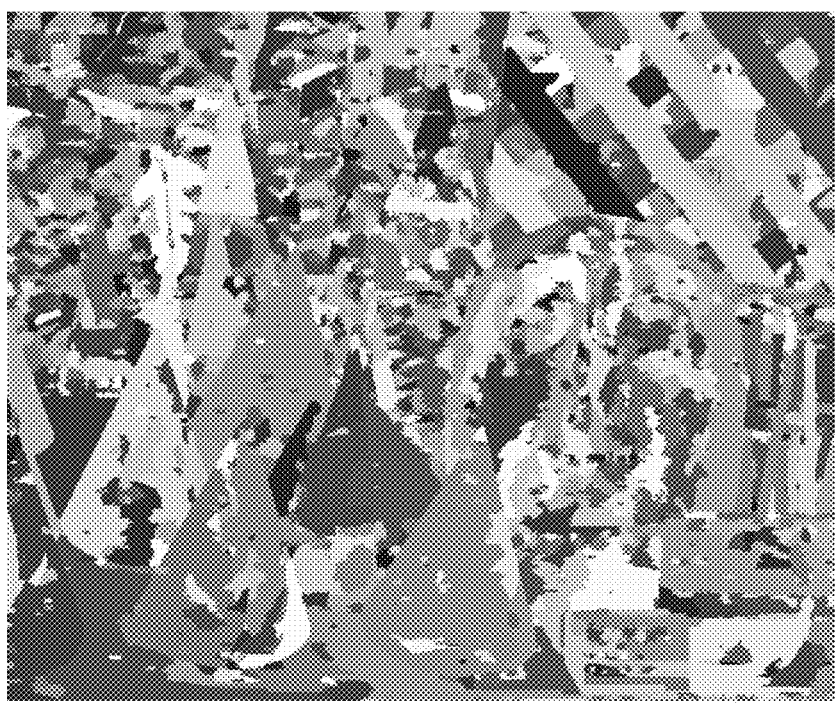
Figure 16B:

For example, FIGS. 16a and 16b show respectively the left image of FIG. 1a wherein a segmentation filter and a segmentation filter in combination with a border/edge detection filter have been applied.

In an embodiment, the computation time may be improved, because only a limited number of candidate pixels in the first image and a limited comparison area in the second image are used instead of processing the whole images. In an embodiment, the quality of the depth map image may be improved because occlusions and thin objects may be handled due to the masking operation. In an embodiment, parallel processing may be performed, e.g., by performing several block of pixel or even pixel masking and matching operations in parallel, thus facilitating fast hardware implementations.

Moreover, for several embodiments a single iteration over all candidate pixels may be sufficient and bidirectional cross-check between the images may be avoided.

Some embodiments may take the form of or include computer program products. For example, according to one embodiment there is provided a computer readable medium including a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some of the systems and/or modules and/or circuits and/or blocks may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   selecting a plurality of reference pixels in a first image;
   associating with each reference pixel a respective pixel in a second image, the associating including:
   selecting a block of pixels surrounding the reference pixel;
   selecting a plurality of candidate pixels in the second image;
   for each candidate pixel in the second image,
      selecting a block of pixels surrounding the candidate pixel, said block of pixels surrounding the candidate pixel having a same dimension as said block of pixels surrounding the reference pixel;
      identifying a subset of pixels in at least one of the block of pixels surrounding the reference pixel and the block of pixels surrounding the candidate pixel, the identifying the subset of pixels including identifying pixels in the block of pixels surrounding the reference pixel which have similar values as corresponding pixels in the block of pixels surrounding the candidate pixel; and
      determining a cost associated with the candidate pixel based on the identified subset of pixels; and
   selecting a subset of the candidate pixels based on the determined costs;
   determining a disparity between each reference pixel and the respective pixel in said second image;
   determining for each reference pixel a depth value as a function of the respective disparity; and
   generating a depth map based on the determined depth values.

2. The method of claim 1 wherein the associating includes filtering pixels of the selected subset of candidate pixels and associating one of the pixels of the selected subset with the respective reference pixel based on the filtering.

3. The method of claim 1 wherein:
   said selecting a block of pixels surrounding the reference pixel comprises selecting a block of pixels centered on said reference pixel; and
   said selecting a block of pixels surrounding the candidate pixel comprises selecting a block of pixels centered on the candidate pixel.

4. The method of claim 1 wherein said selecting a plurality of candidate pixels comprises selecting pixels in said second image which belong to a same row as said reference pixel.

5. The method of claim 1 wherein the identifying the subset of pixels includes at least one of:
   selecting, in said block of pixels surrounding the reference pixel, pixels having similar values as said reference pixel; and
   selecting, in said block of pixels surrounding the candidate pixel, pixels having a similar value as said candidate pixel.

6. The method of claim 1 wherein identifying pixels having similar values comprises at least one of:
   comparing a value indicative a difference between grayscale values of the pixels with a threshold grayscale difference; and
   comparing a value indicative of a difference between color values of the pixels with a threshold color difference.

7. The method of claim 1, wherein said selecting a plurality of reference pixels in said first image comprises at least one of:
   selecting all pixels in said first image;
   selecting a subset of pixels of the first image based on pre-matching; and
   down-sampling the first image.

8. The method of claim 1 wherein said selecting a plurality of reference pixels in the first image comprises:
   selecting a block of pixels surrounding a pixel in said first image;
   calculating an average value of pixels in said block of pixels surrounding the pixel in said first image and associating said average value with said pixel in said first image;
   selecting a plurality of candidate pixel in said second image;
   selecting for each candidate pixel in said second image a respective block of pixel surrounding the pixel in said second image;
   calculating an average value of the pixels of each of said blocks of pixels surrounding the respective candidate pixels in said second image and associating said average value with the respective pixel in said second image; and
   selecting pixels in said first image based on whether at least one candidate pixel in said second image is associated with a similar average value.

9. The method of claim 1 wherein selecting a plurality of reference pixels in the first image comprises:
   selecting a block of pixels surrounding a respective pixel in said first image;
   calculating an average gradient value, with respect to the value of the respective pixel, of the pixels in said block of pixels surrounding the respective pixel; and
   selecting the pixels in said first image which have an average gradient above a threshold gradient value.

10. The method of claim 1 wherein selecting a plurality of candidate pixels comprises:
    selecting a block of pixels surrounding a respective pixel in said second image;
    calculating an average gradient value, with respect to the value of the respective pixel of the second image, of the pixels in said block of pixels surrounding the respective pixel of the second image; and
    selecting the pixels in said second image which have an average gradient above a threshold gradient value.

11. A system, comprising:
    one or more memories; and
    processing circuitry coupled to the one or more memories, which, in operation,
       selects a plurality of reference pixels in a first image;

associates with each reference pixel a respective pixel in a second image, the associating including:
  selecting a block of pixels surrounding the reference pixel;
  selecting a plurality of candidate pixels in the second image;
  for each candidate pixel in the second image,
    selecting a block of pixels surrounding the candidate pixel, said block of pixels surrounding the candidate pixel having a same dimension as said block of pixels surrounding the reference pixel;
    identifying a subset of pixels in at least one of the block of pixels surrounding the reference pixel and the block of pixels surrounding the candidate pixel, the identifying the subset of pixels including identifying pixels in the block of pixels surrounding the reference pixel which have similar values as corresponding pixels in the block of pixels surrounding the candidate pixel; and
    determining a cost associated with the candidate pixel based on the identified subset of pixels; and
  selecting a subset of the candidate pixels based on the determined costs;
  determining a disparity between each reference pixel and the respective pixel in said second image;
  determining for each reference pixel a depth value as a function of the respective disparity; and
  generating a depth map based on the determined depth values.

12. The system of claim 11 wherein the associating includes filtering pixels of the selected subset of candidate pixels and associating one of the pixels of the selected subset with the respective reference pixel based on the filtering.

13. The system of claim 11 wherein:
  said selecting a block of pixels surrounding the reference pixel comprises selecting a block of pixels centered on said reference pixel; and
  said selecting a block of pixels surrounding the candidate pixel comprises selecting a block of pixels centered on the candidate pixel.

14. The system of claim 11 wherein the identifying the subset of pixels includes at least one of:
  selecting, in said block of pixels surrounding the reference pixel, pixels having similar values as said reference pixel; and
  selecting, in said block of pixels surrounding the candidate pixel, pixels having a similar value as said candidate pixel.

15. The system of claim 11 wherein identifying pixels having similar values comprises at least one of:
  comparing a value indicative a difference between grayscale values of the pixels with a threshold grayscale difference; and
  comparing a value indicative of a difference between color values of the pixels with a threshold color difference.

16. The system of claim 11, wherein said selecting a plurality of reference pixels in said first image comprises at least one of:
  selecting all pixels in said first image;
  selecting a subset of pixels of the first image based on pre-matching; and
  down-sampling the first image.

17. The system of claim 11 wherein said selecting a plurality of reference pixels in the first image comprises:
  selecting a block of pixels surrounding a pixel in said first image;
  calculating an average value of pixels in said block of pixels surrounding the pixel in said first image and associating said average value with said pixel in said first image;
  selecting a plurality of candidate pixel in said second image;
  selecting for each candidate pixel in said second image a respective block of pixel surrounding the pixel in said second image;
  calculating an average value of the pixels of each of said blocks of pixels surrounding the respective candidate pixels in said second image and associating said average value with the respective pixel in said second image; and
  selecting pixels in said first image based on whether at least one candidate pixel in said second image is associated with a similar average value.

18. A non-transitory computer-readable memory medium whose contents configure an image processing system to generate a depth map by performing a method, the method comprising:
  selecting a plurality of reference pixels in a first image;
  associating with each reference pixel a respective pixel in a second image, the associating including:
    selecting a block of pixels surrounding the reference pixel;
    selecting a plurality of candidate pixels in the second image;
    for each candidate pixel in the second image,
      selecting a block of pixels surrounding the candidate pixel, said block of pixels surrounding the candidate pixel having a same dimension as said block of pixels surrounding the reference pixel;
      identifying a subset of pixels in at least one of the block of pixels surrounding the reference pixel and the block of pixels surrounding the candidate pixel, the identifying the subset of pixels including identifying pixels in the block of pixels surrounding the reference pixel which have similar values as corresponding pixels in the block of pixels surrounding the candidate pixel; and
      determining a cost associated with the candidate pixel based on the identified subset of pixels; and
    selecting a subset of the candidate pixels based on the determined costs;
  determining a disparity between each reference pixel and the respective pixel in said second image;
  determining for each reference pixel a depth value as a function of the respective disparity; and
  generating the depth map based on the determined depth values.

19. The non-transitory computer-readable medium of claim 18 wherein the identifying the subset of pixels includes at least one of:
  selecting, in said block of pixels surrounding the reference pixel, pixels having similar values as said reference pixel; and
  selecting, in said block of pixels surrounding the candidate pixel, pixels having a similar value as said candidate pixel.

20. The non-transitory computer-readable medium of claim 18 wherein said selecting a plurality of reference pixels in the first image comprises:

selecting a block of pixels surrounding a pixel in said first image;

calculating an average value of pixels in said block of pixels surrounding the pixel in said first image and associating said average value with said pixel in said first image;

selecting a plurality of candidate pixel in said second image;

selecting for each candidate pixel in said second image a respective block of pixel surrounding the pixel in said second image;

calculating an average value of the pixels of each of said blocks of pixels surrounding the respective candidate pixels in said second image and associating said average value with the respective pixel in said second image; and selecting pixels in said first image based on whether at least one candidate pixel in said second image is associated with a similar average value.

\* \* \* \* \*